(12) United States Patent
Portisch et al.

(10) Patent No.: US 12,405,972 B2
(45) Date of Patent: Sep. 2, 2025

(54) SYSTEMS AND METHODS FOR MANIPULATING TIME-DEPENDENT RELATIONSHIPS IN KNOWLEDGE GRAPH DATA STRUCTURES

(71) Applicant: SAP SE, Walldorf (DE)

(72) Inventors: Jan Portisch, Bruchsal (DE); Sandra Bracholdt, Dielheim (DE)

(73) Assignee: SAP SE, Walldorf (DE)

( * ) Notice: Subject to any disclaimer, the term of this patent is extended or adjusted under 35 U.S.C. 154(b) by 42 days.

(21) Appl. No.: 17/973,311

(22) Filed: Oct. 25, 2022

(65) Prior Publication Data
US 2024/0134887 A1 Apr. 25, 2024
US 2024/0232233 A9 Jul. 11, 2024

(51) Int. Cl.
*G06F 16/00* (2019.01)
*G06F 16/22* (2019.01)
*G06F 16/2458* (2019.01)
*G06F 16/28* (2019.01)

(52) U.S. Cl.
CPC ........ *G06F 16/288* (2019.01); *G06F 16/2228* (2019.01); *G06F 16/2477* (2019.01)

(58) Field of Classification Search
CPC .......................... G06F 16/288; G06F 16/2228
See application file for complete search history.

(56) References Cited

U.S. PATENT DOCUMENTS

| | | | | |
|---|---|---|---|---|
| 11,922,942 | B1* | 3/2024 | Kilinc | G10L 15/26 |
| 2009/0192968 | A1* | 7/2009 | Tunstall-Pedoe | G06N 5/02 |
| | | | | 706/53 |
| 2010/0198503 | A1* | 8/2010 | Beckner | G06F 16/29 |
| | | | | 707/E17.001 |
| 2011/0307435 | A1* | 12/2011 | Overell | G06F 16/367 |
| | | | | 706/46 |
| 2023/0004583 | A1* | 1/2023 | Marmanis | G06F 16/287 |

OTHER PUBLICATIONS

"Data and Analytics Essentials: Data Fabric", Gartner [Online]. Retrieved from the Internet: <URL: https://www.gartner.com/en/documents/4003523>, (Jul. 13, 2021), 6 pgs.

(Continued)

*Primary Examiner* — Vincent F Boccio
(74) *Attorney, Agent, or Firm* — SCHWEGMAN LUNDBERG & WOESSNER, P.A.

(57) ABSTRACT

Various examples are directed to systems and methods for utilizing relationship data. A computing system may receive a time-dependent query against a knowledge graph data structure. The computing system may access confirmation data from the knowledge graph data structure, the confirmation data describing a first plurality of confirmation points-in-time at which the first test relationship is true. The computing system may determine that at least one of a beginning or an end of a first time period associated with a test relationship of the time-dependent query is not defined by the knowledge graph data structure. The computing system may determine a response to the first time-dependent query indicating a veracity of the test relationship at a test point-in-time using the first plurality of confirmation points-and-time.

20 Claims, 25 Drawing Sheets

(56) References Cited

OTHER PUBLICATIONS

Bach, Nguyen, et al., "A Review of Relation Extraction", Literature review for Language and Statistics, (2007), 15 pgs.

Panetta, Kasey, "5 Trends Appear on the Gartner Hype Cycle for Emerging Technologies, 2019", Gartner, Inc., [Online]. Retrieved from the Internet: <URL: https://www.gartner.com/smarterwithgartner/5-trends-appear-on-the-gartner-hype-cycle-for-emerging-technologies-2019>, (Aug. 29, 2019), 6 pgs.

Paulheim, Heiko, "Knowledge Graph Refinement: A Survey of Approaches and Evaluation Methods", Semantic Web, 8(3), IOS Press, (2016), 489-508.

Pawar, Sachin, et al., "Relation Extraction: A Survey", (2017), 51 pgs.

* cited by examiner

SAP Company Knowledge Graph

User Question: [ What is ODM? ] [Search] — 906
904

Results:

| Statement | Source Category | Likeliness | Further Details | Voting | |
|---|---|---|---|---|---|
| ODM is a Data Model | SAP Internal, External | 80% | ⇧ | ✓ | ✗ |
| ODM is Original Design Manufacturer | External | 50% | ⇧ | ✓ | ✗ |
| Orange Democratic Movement | External | 20% | ⇧ | ✓ | ✗ |

SAP Company Knowledge Graph

User Question: *What is ODM?* [Search] ← 906

Results: ← 908

| Statement | Source Category | Details | Voting |
|---|---|---|---|
| ODM is a Data Model | SAP Int... | | ✓ ✗ |
| ODM is Original Design Manufacturer | External | | ✓ ✗ |
| Orange Democratic Movement | External | | ✓ ✗ |

↙ 1002

Please tell us, why you are voting negative:

☐ Statement does not fit to question
☐ Outdated statement
☐ Statement is wrong
☐ Other: [_____]

SYSTEMS AND METHODS FOR MANIPULATING TIME-DEPENDENT RELATIONSHIPS IN KNOWLEDGE GRAPH DATA STRUCTURES

BACKGROUND

Knowledge graphs are commonly used to represent human-usable information in a computing system. For example, a knowledge graph may be used to store enterprise information in a business or other enterprise in a way that is manageable by a computing system. Enterprise users may retrieve information from the knowledge graph using the computing system.

BRIEF DESCRIPTION OF DRAWINGS

The present disclosure is illustrated by way of example and not limitation in the following figures.

FIG. 9 is a diagram showing another example of a user interface page that may be provided to the user.

FIG. 10 shows another example of the user interface page of FIG. 9 including a feedback window.

DETAILED DESCRIPTION

Figure 1:
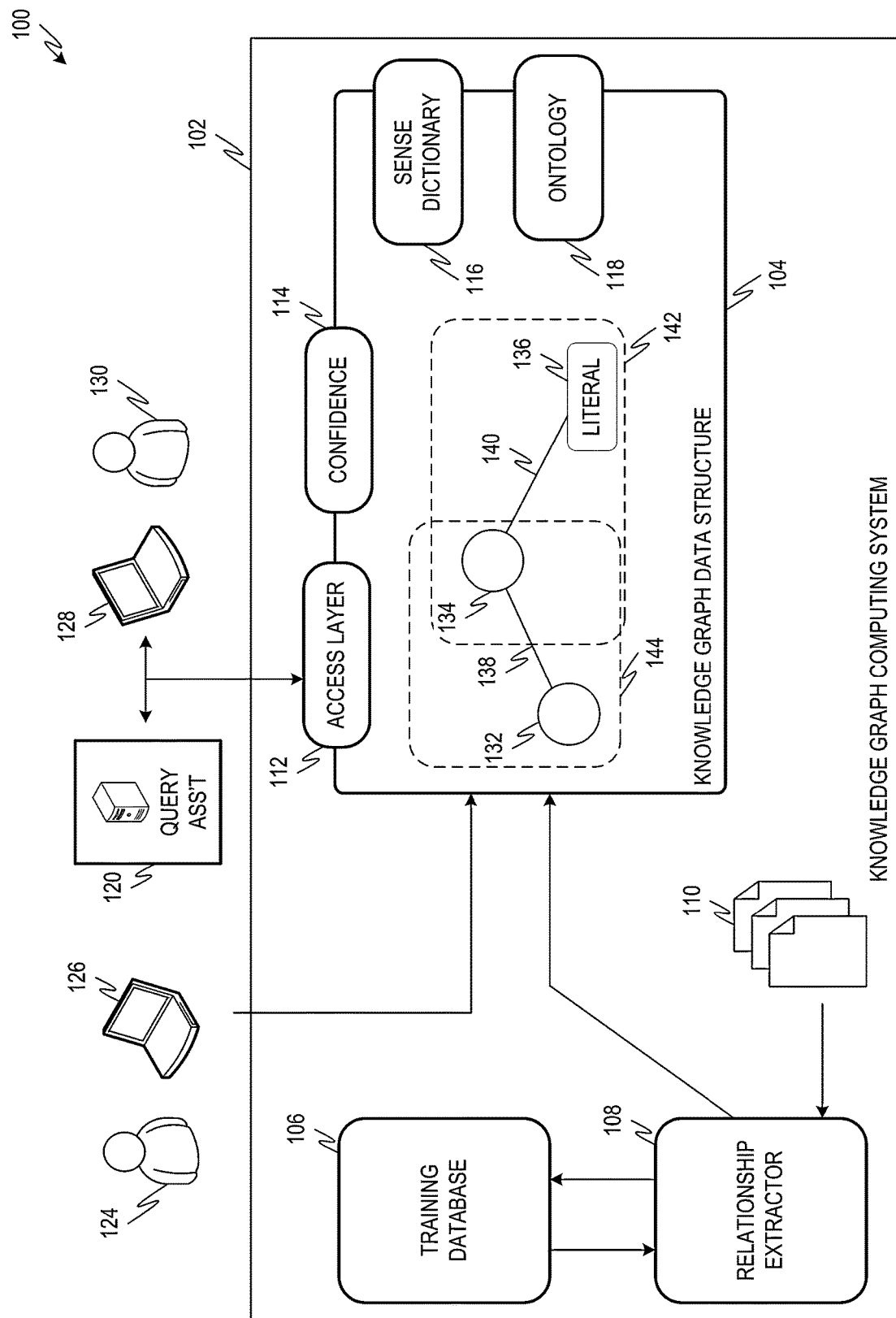
FIG. 1 is a diagram showing one example of an environment for generating and/or maintaining a knowledge graph data structure.

Knowledge graphs can be used in various different computing systems to store and retrieve information about relationships. Consider an example in which a computing system uses a knowledge graph to store relationships that indicate skills held by enterprise employees. In this example, a user of the computing system may be a manager who has been tasked with implementing a machine learning algorithm. The user however may not be an expert in machine learning algorithms and may not be directly aware of any experts in machine learning algorithms within the enterprise employing the user. The user may make a query against the knowledge graph requesting the identity of employees who are skilled in machine learning algorithms. The knowledge graph computing system may return relationships stored by the knowledge graph data structure that indicate employees skilled in machine learning algorithms.

Consider an example relationship "employee A is skilled in machine learning algorithms." In this example, the subject entity is "employee A," the object entity is "machine learning algorithms" and the predicate is "is skilled in." The computing system may return the indicated relationship to the user, along with other relationships stored by the knowledge graph also indicating skill in machine learning algorithms. In this way, the user may identify enterprise employees who may be suitable to implement the machine learning algorithm that has been tasked to the user.

Although a knowledge graph can be very useful in this scenario, the use of a knowledge graph in computing systems can present other challenges. For example, building a knowledge graph may be a time-consuming, and often manual, process. Also, the existence of relationships in a knowledge graph may not provide a user with an indication of the veracity of the relationship. Consider again the example above. In some examples, employee A may be skilled in machine learning algorithms that were state-of-the-art at the time that the relationship was added to the knowledge graph data structure but may not be skilled in more recent machine learning algorithms. In this case, the usefulness of the relationship provided to the user may be compromised. Also, in some examples, employee A may have been in a developer role at the time the relationship was added to the knowledge graph data structure but may have subsequently transitioned to a management role or another role that does not involve active coding, or may have left the enterprise. In these and other examples, the relationship "employee A is skilled in machine learning algorithms" may not be useful to the user.

Various examples address these and other challenges by utilizing a knowledge graph data structure and associated systems and methods, as described herein. For example, a knowledge graph data structure may be constructed with triple data units. A triple data unit may describe a relationship. The triple data unit may comprise a subject subunit indicating a subject entity, and object subunit indicating an object, and a predicate subunit describing a predicate of the subject entity and the object. A triple data unit may also include other subunits such as, for example a confidence subunit comprising data indicating a confidence in the accuracy of the relationship. Other example subunits of a triple data unit may include, for example, a confidentiality subunit indicating a level of confidentiality of the relationships stored by the triple data unit, an author subunit indicating an author of a document or documents from which the relationship was extracted, a location subunit indicating a location of the document or documents from which the relationship was extracted, and/or a last edit subunit indicating the last time that the document or documents from which the relationship was extracted have been edited.

In some examples, a triple data unit may also include a time subunit storing data describing temporal properties of the relationship. The time subunit may include data describing the veracity of the relationship represented by the triple data unit at one or more times. For example, the time subunit may include an indication of one or more confirmation points-in-time. A confirmation point-in-time may be a point in time at which the relationship represented by the triple data unit is true. In some examples, the time subunit may also indicate one or more periods during which the relationship represented by the triple data unit is, or was, true.

In various examples, a knowledge graph data structure may be generated from enterprise and/or external documents in an automated manner. Automated knowledge graph data structure generation may be based on an ontology and/or using a machine learning model. For example, an ontology-based technique and/or machine learning technique may be used to generate a knowledge graph data structure. Users may utilize a knowledge graph computing system to make queries against the knowledge graph data structure. The knowledge graph computing system may generate responses to the queries. Query responses provided to users may include descriptions of the relationships that are responsive to the query and a feedback request. The feedback request may prompt the user to provide feedback data describing a confidence value in one or more of the returned relationships. The feedback data may indicate, for example, whether a relationship is true or false and, in some examples when the relationship is, or was, true or false. In some examples, the feedback may also indicate a degree of confidence in the truth of the indicated relationship.

The knowledge graph computing system may utilize the feedback to generate labeled training data. For example, labeled training data may include an indication of the relationship (e.g., subject entity, object, and predicate) as well as an indication of a confidence value, where the confidence value indicates a likelihood that the relationship is true. Training data generated in this way by the knowledge graph computing system may be used to train or re-train a machine learning model for extracting additional relationships from documents. In this way, the generation and supplementing of the knowledge graph data structure may be performed by the knowledge graph computing system in an automated or semiautomated manner.

FIG. 1 is a diagram showing one example of an environment 100 for generating and/or maintaining a knowledge graph data structure 104. The knowledge graph data structure 104 may be maintained by a knowledge graph computing system 102. The knowledge graph computing system 102 may be or include any suitable computing device or devices, such as one or more servers. The knowledge graph computing system 102, for example, may be implemented in an on-premise and/or cloud-based computing environment.

The knowledge graph computing system 102 may maintain the knowledge graph data structure 104 at one or more machine-readable media, which may be implemented in one or more databases or other suitable data stores. The knowledge graph data structure 104 may include various triple data units 142, 144. Each triple data unit 142, 144 may describe a relationship and may include various subunits including, for example, a subject subunit, and object subunit, and a predicate subunit. In the example of FIG. 1, the knowledge graph data structure 104 describes a knowledge graph comprising entities 132, 134, predicates 138, 140, and a literal 136. It will be appreciated that the knowledge graph data structure 104 may describe additional entities, predicates, and literals. The components shown in FIG. 1 are illustrated for example purposes.

The triple data unit 144 describes a relationship in which the entity 132 is the subject, the entity 134 is the object, and the predicate 138 is the predicate. Accordingly, the triple data unit 144 may include a subject subunit describing the entity 132, a predicate subunit describing the predicate 138, and an object subunit describing the entity 134. The triple data unit 142 describes a relationship in which the entity 134 is the subject, the predicate 140 is the predicate, and the literal 136 is the object. In some examples, a literal may be an object but may not be a subject of a relationship. Accordingly, the triple data unit 142 may include a subject subunit describing the entity 134, a predicate subunit describing the predicate 140, and an object subunit describing the literal 136. The example triple data units 144, 142 may also include other data describing the indicated relationships such as, for example, confidence data describing the veracity of the relationships, confidentiality level data describing a confidentiality of the relationships, and so on, as described herein. Additional examples describing the structure of triple data units are provided herein including, for example, with respect to FIG. 2.

The knowledge graph computing system 102 may implement various subsystems 112, 114, 116, 118 to facilitate training, modification, and the use of the knowledge graph data structure 104. Subsystems 112, 114, 116, 118 may include executable code, computing hardware, such as one or more hardware processors, one or more machine-readable media, and/or the like.

The access layer subsystem 112 may interface with a user 130 via a user computing device 128. The user 130 may be any user with privileges to query the knowledge graph data structure. The user 130 may be an internal or enterprise user associated with an enterprise implementing the knowledge graph computing system 102. In some examples, the user 130 may be an external user outside of the enterprise implementing the knowledge graph computing system 102. FIG. 1 also shows an administrative user 124 who may access the knowledge graph computing system 102 via a user computing device 126. The user computing devices 126, 128 may be any suitable computing device such as, for example, a laptop computer, a desktop computer, a tablet computer, a mobile computing device, and/or the like. Although two users 124, 130 are shown in FIG. 1, it will be appreciated that multiple different users may access the knowledge graph computing system 102, for example, to utilize and/or administer the knowledge graph data structure 104 as described herein.

The access layer subsystem 112 may support queries against the knowledge graph data structure 104. For example, the user 130 may generate a query using the user computing device 128 and provide the query to the knowledge graph computing system 102 via the access layer subsystem 112. The access layer subsystem 112 may execute the query against the knowledge graph data structure 104 and return one or more relationships described by the knowledge graph data structure 104 that are responsive to the query. In some examples, the access layer subsystem 112 provides the user 130 with query results via an interface page that also includes a request for feedback data about one or more of the indicated relationships.

The environment 100 also includes a query assistant system 120. The query assistant system 120 is shown separate from the knowledge graph computing system 102. In some examples, however, the query assistant system 120 may be implemented as a subsystem of the knowledge graph computing system 102. The query assistant system 120 may be programmed to assist the user 130 in generating queries against the knowledge graph data structure 104. For example, the user 130 may direct a natural language question to the query assistant system 120. The query assistant system 120 may be programmed to convert the natural language question to one or more queries against the knowledge graph data structure 104. In some examples, the query assistant system 120 may make queries against the knowledge graph data structure 104 in the course of assisting the user 130. For example, when the user 130 makes a natural language query to the query assistant system 120, the query assistant system 120 may respond by making one or more queries against the knowledge graph data structure 104. The query assistant system 120 may return results of the query to the user 130 and/or may use results of the query to recommend a query against the knowledge graph data structure 104 to the user 130.

The confidence subsystem 114 may be configured to manage confidence values for one or more relationships indicated by triple data units 142, 144 of the knowledge graph data structure 104. In some examples, the confidence subsystem 114 may generate an initial confidence value for a relationship when the relationship is added to the knowledge graph data structure 104 as a triple data unit 142, 144. The confidence subsystem 114 may also update the confidence value associated with a relationship in response to feedback data provided by enterprise users such as the user 130.

The sense dictionary subsystem 116 may be configured to resolve sense disambiguation in human-readable text. The sense dictionary subsystem 116 may be used, for example, when a relationship is written to the knowledge graph data structure 104, when modifying relationships described by triple data units at the knowledge graph data structure 104, in responding to queries against the knowledge graph data structure 104, and/or the like.

Consider the term "bank." This may refer to the edge of a body of water or a financial institution. The sense dictionary subsystem 116 may receive an indication of a relationship including a subject entity, predicate, and object. The sense dictionary subsystem 116 may return an indication of a sentence associated with at least one of the subject entity, the predicate, or the object. Returning to the example above, the relationship: "XYZ is a bank" may have a subject entity "XYZ," a predicate "is a," and an object "bank." The sense dictionary subsystem 116 may utilize the relationship and, in some examples, text from which the relationship was extracted and provide sense data indicating that the object "bank" refers to a financial institution.

The ontology subsystem 118 may be configured to store and/or administer an ontology. The ontology may describe relationships between words and corresponding entities, predicates, and/or literals that may be described by triple data units at the knowledge graph data structure 104. In some examples, the ontology subsystem 118 may communicate with the relationship extractor system 108, as described herein, to facilitate the extraction of relationships from documents 110, as described herein.

The ontology may comprise information that may be represented in the knowledge graph data structure 104. For example, the ontology may include information about relationships of different types including, for example, what sorts of entities can be subjects of the relationship, what sorts of objects and/or literals can be objects of the relationship, and the like. In some examples, the ontology may store words that may be used, for example, in natural language to represent a relationship. Consider an example relationship with a predicate "works on," such as, for example, A works on B. One example implementation of this relationship may be "Employee X works on New_Project." The ontology may list words indicating relationships of the relevant type such as "works on," "is assigned to," "is on the project team for," and/or the like. In this example, all of the following phrases may indicate the relationship: "Employee X works on New_Project." "Employee X is assigned to New_Project." "Employee X is on the project team for New_Project."

In some examples the ontology managed by the ontology subsystem 118 may also store information about time dependencies of relationship. For example, a relationship may be time dependent or time independent. A relationship that is time dependent may have a veracity that changes at different points-in-time. Consider again the example relationship "works on." This relationship may be true at some times and false at other times and, therefore, may be indicated at the ontology to be time dependent. Other examples of relationships that may be time dependent include "lives," "works for," "has temperature," and "has market price."

A relationship may be time independent if its veracity is always the same for all time. Consider another example relationship "born on." This relationship may be time independent because the birth date of an entity (a person) does not change with time and therefore a statement of a birth date is either true or false for all time. In some examples, the ontology subsystem 118 supports the additional time dependency categories such as, for example, time-dependency-ignored. A relationship may be classified as time-dependency-ignored, for example, if the relationship can change with time but practically does not change very often. Consider the following example relationships: "has currency," and "is the capital of." Although it is possible for a country or similar entity to change its currency and it is possible for a country or similar entity to change its capital, such changes do not occur very often. As such it may not be practical to manage these relationships as time dependent in the knowledge graph data structure 104.

In some examples, the ontology managed by the ontology subsystem 118 may indicate a type of time dependency for time-dependent relationships. For example, a relationship may have a single period of time dependency or a multi-period time dependency. A relationship having a single-period time dependency may be true only during a single continuous time and false at all other times. A relationship having a multi-period time dependency may be true at multiple, non-continuous time periods. Consider the example relationship "lives." An entity (a human) only lives once. Therefore, a relationship indicating that a particular human being lives is true only during one continuous time period and the relationship "lives" has a single-period time dependency. Consider another example relationship "works for." An entity, such as a human, may work for the same company during two different non-continuous time periods. Accordingly, the relationship "works for" as a multi-period time dependency.

In some examples, the ontology managed by ontology subsystem 118 may support other types of time dependencies such as, for example, a multi-period-ignored time dependency. A relationship may have a multi-period-ignored time dependency if, for example, it is technically possible, but very unlikely, for the relationship to be true during two non-continuous time periods. Consider the example relationship "is Chancellor of Germany." This relationship may technically have a multi-period time dependency because it is possible to be Chancellor of Germany during more than one time. Practically, however, it may be very rare for an individual to be Chancellor of Germany during multiple noncontinuous time periods.

The knowledge graph computing system 102 also includes a relationship extractor system 108 and a training database 106. The relationship extractor system 108 may comprise executable code, computing hardware, such as one or more hardware processors, one or more machine-readable media, and/or the like. Although the relationship extractor system 108 is shown as a component of the knowledge graph computing system 102, in various examples, the relationship extractor system 108 may be implemented as a separate computing system.

The relationship extractor system 108 may be configured to extract relationships from documents 110. The documents 110 may be or include any suitable document associated with the enterprise implementing the knowledge graph computing system 102. The documents 110 may include, for example, internal documents generated by the enterprise as well as external documents generated by parties outside the enterprise. Examples of document types that may be included in the documents 110 include product documents, intranet pages, transcriptions, Internet pages, books, email messages, and/or the like. Product documents may include documents describing a product or service provided by the enterprise implementing the knowledge graph computing system 102. Intranet pages may include pages from an internal network accessible to some or all users associated with the enterprise implementing the knowledge graph computing system 102. Transcriptions may include documents that reflect an automated and/or manual transcription of meetings, conversations, and/or other interactions between people associated with the enterprise.

In some examples, the relationship extractor system 108 operates utilizing the ontology subsystem 118 and/or the ontology managed thereby. The ontology may include a set of words describing various different entities, literals, and predicates. The relationship extractor system 108 may examine the documents 110 to find instances of words indicating a combination of a subject entity, a predicate, and an object entity or littoral.

In other examples, the relationship extractor system 108 is programmed to implement a machine learning model. The machine learning model may be, for example, a classifier that is trained to extract relationships from the documents 110. The machine learning model may be trained using labeled training data stored at the training database 106. In some examples, as described herein, the training database 106 may be populated with training data that is derived from feedback data received from enterprise users such as the user 130.

In some examples, the relationship extractor system 108 is programmed to extract relationships from documents 110 using the ontology managed by the ontology subsystem 118 and a machine learning model. For example, the relationship extractor system 108 may initially extract relationships from the documents 110 using the ontology subsystem 118 as described herein. This may generate and/or supplement the knowledge graph data structure 104. As users, such as the user 130, query the knowledge graph data structure 104 and provide feedback data, the feedback data may be used to generate labeled training data that that may be stored at the training database 106. A machine learning model may be trained using the training data. When the machine learning model is trained, the relationship extractor system 108 may begin to extract relationships from the documents 110 using the machine learning model.

When the relationship extractor system 108 determines a relationship from the documents 110, it may add the relationship to the knowledge graph data structure 104. This may include generating a new triple data unit corresponding to the relationship, and/or supplementing an existing triple data unit describing the relationship. For example, a relationship extracted by the relationship extractor system 108 may already be represented by a triple data unit at the knowledge graph data structure 104. If this is the case, the relationship extractor system 108 may, rather than writing a new triple data unit, modify the existing triple data unit describing the relationship. For example, the relationship extractor system 108 may update a confidence value for the relationship stored at a confidence subunit of an existing triple data unit based on the document 110 from which the relationship was extracted.

In some examples, the relationship extractor system 108 may provide an extracted relationship to the administrative user 124, who may access the extracted relationship via the user computing device 126. The administrative user 124 may provide an initial confidence value for the relationship. The confidence value provided by the administrative user 124 may become the confidence value for the relationship and/or may be supplemented with other data such as, for example, the document 110 from which the relationship was extracted.

Figure 2:
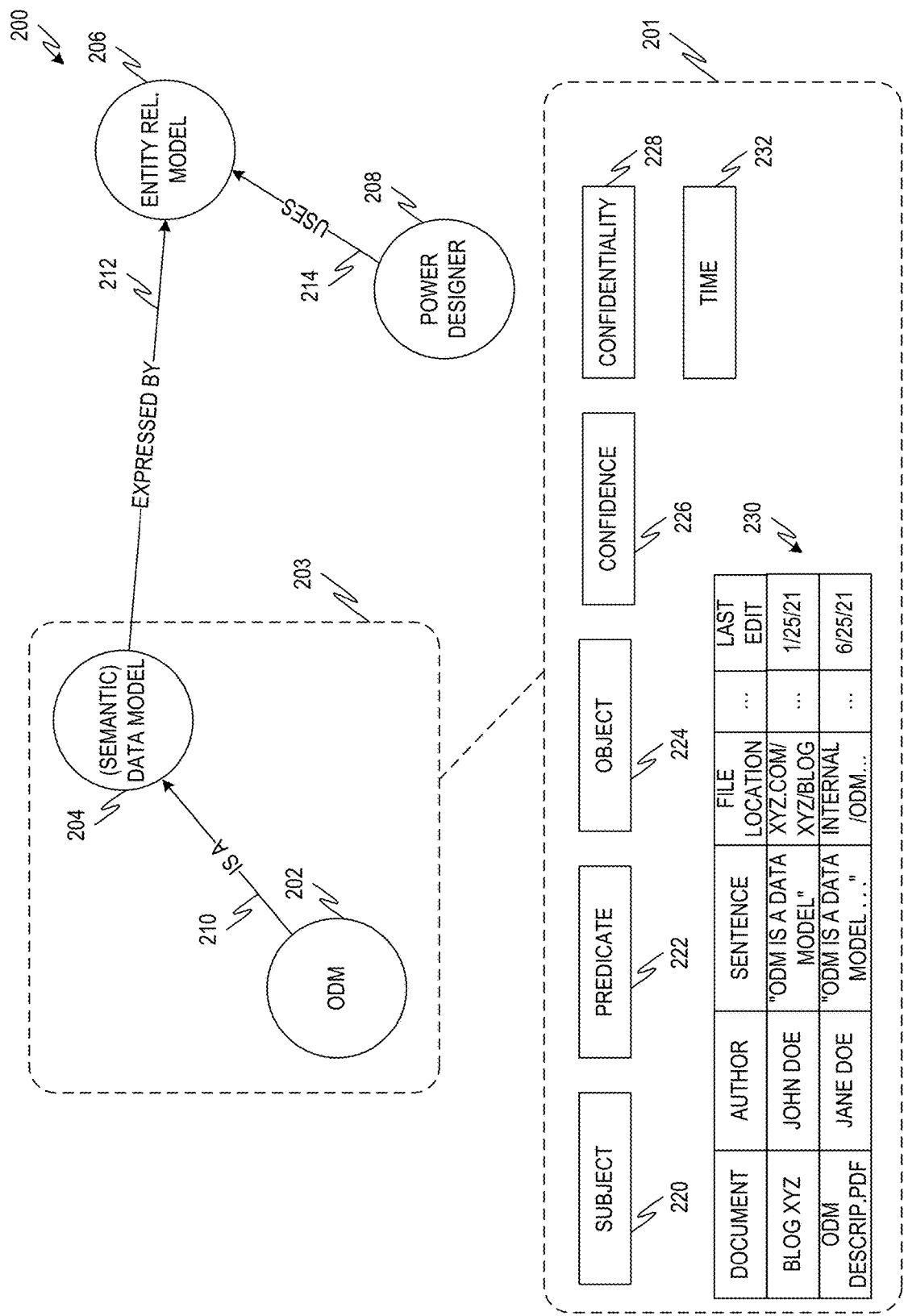
FIG. 2 is a diagram showing a fragment of a knowledge graph and illustrating an example triple data unit including metadata describing a relationship represented by the example knowledge graph.

FIG. 2 is a diagram showing a fragment 200 of a knowledge graph and illustrating an example triple data unit 201 describing a relationship 203 represented by the example knowledge graph fragment 200. The knowledge graph fragment 200 includes entities 202, 204, 206, 208 and predicates 210, 212, 214. In the example of FIG. 2, entities 202, 204, 206, 208 are indicated by circles. Predicates 210, 212, 214 are indicated by arrows.

The entity 202 is "ODM (Operational Data Model)". The entity 204 is "data model." In the example of FIG. 2, the entity 204 data model has been assigned a sense "semantic." For example, the sense "semantic" may differentiate the entity 204 from entities for database data models, physical data models, and other types of data models. In some examples, the sense may have been assigned by the sense dictionary subsystem 116. The predicate 210 is "is a." Accordingly, the relationship 203 can be stated as "ODM is a data model."

The knowledge graph fragment 200 shows other example relationships. For example, the relationship "data model is expressed by entity relationship model" is shown by entity 204, predicate 212, and entity 206. An additional example relationship "power designer uses entity relationship model" is expressed by entity 208, predicate 214, and entity 206.

FIG. 2 shows an example triple data unit 201 describing the relationship 203. The triple data unit 201 comprises various subunits including, for example, the subject subunit 220, a predicate subunit 222, and an object subunit 224. The subject subunit 220, the predicate subunit 222, and the object subunit 224 describe the subject, predicate, and object of the relationship 203.

The triple data unit 201 may comprise other subunits describing other data about the relationship 203. A confidence subunit 226 may store a confidence value describing a level of confidence in the veracity of the relationship 203. A confidentiality subunit 228 may store an indication of a confidentiality level associated with the relationship 203.

A time subunit 232 may store data describing temporal properties of the relationship 203 represented by the triple data unit 201. For example, the time subunit 232 may store one or more confirmation points-in-time for the relationship 203. A confirmation point-in-time may be a point-in-time at which the relationship 203 is known to be true. Confirmation points-in-time may be compiled and stored at the time subunit 232 in any suitable manner. In some examples, confirmation points-in-time may be derived from documents 110. For example, if a document 110 indicates that the relationship 203 is true, then the date of the document (e.g., the publication date, the last edit date, and/or the like) may be a confirmation point-in-time.

Also, in some examples, the knowledge graph computing system 102 may derive a confirmation point-in-time for one relationship from one or more other relationships. For example, the ontology managed by the ontology subsystem 118 may indicate relationships that are implied by other relationships. Consider the example relationship "lived" with respect to a human subject entity. Numerous other relationships may imply the truth of the relationship "lived" at a particular point-in-time. Examples of such relationships may include "visited," "worked for," "is Chancellor of," and/or the like.

In some examples, the confirmation points-in-time stored at the time subunit 232 may include one or more start dates and/or end dates for the relationship 203. For example, the ontology managed by the ontology subsystem 118 may indicate events that are start dates and/or end dates for different relationships. Consider again the example relationship "lived" with respect to an individual. The ontology may indicate that a relationship "was born on" stored at the knowledge graph data structure 104 and having the same subject entity may indicate a start date for the relationship "lived." Similarly, the ontology may indicate that a relationship "died on" stored at the knowledge graph data structure 104 and having the same subject entity may indicate an end date for the relationship "lived."

Various additional subunits are shown with respect to source data 230. The source data 230 comprises information describing one or more documents 110 from which the relationship 203 was extracted. In this example, the source data 230 comprises a name, author, file location, and last edit date for two documents 110 from which the relationship 203 was extracted. The source data 230, in this example, also comprises an indication of the sentence or other text unit from the respective documents 110 that was used to derive the relationship 203.

Figure 3:
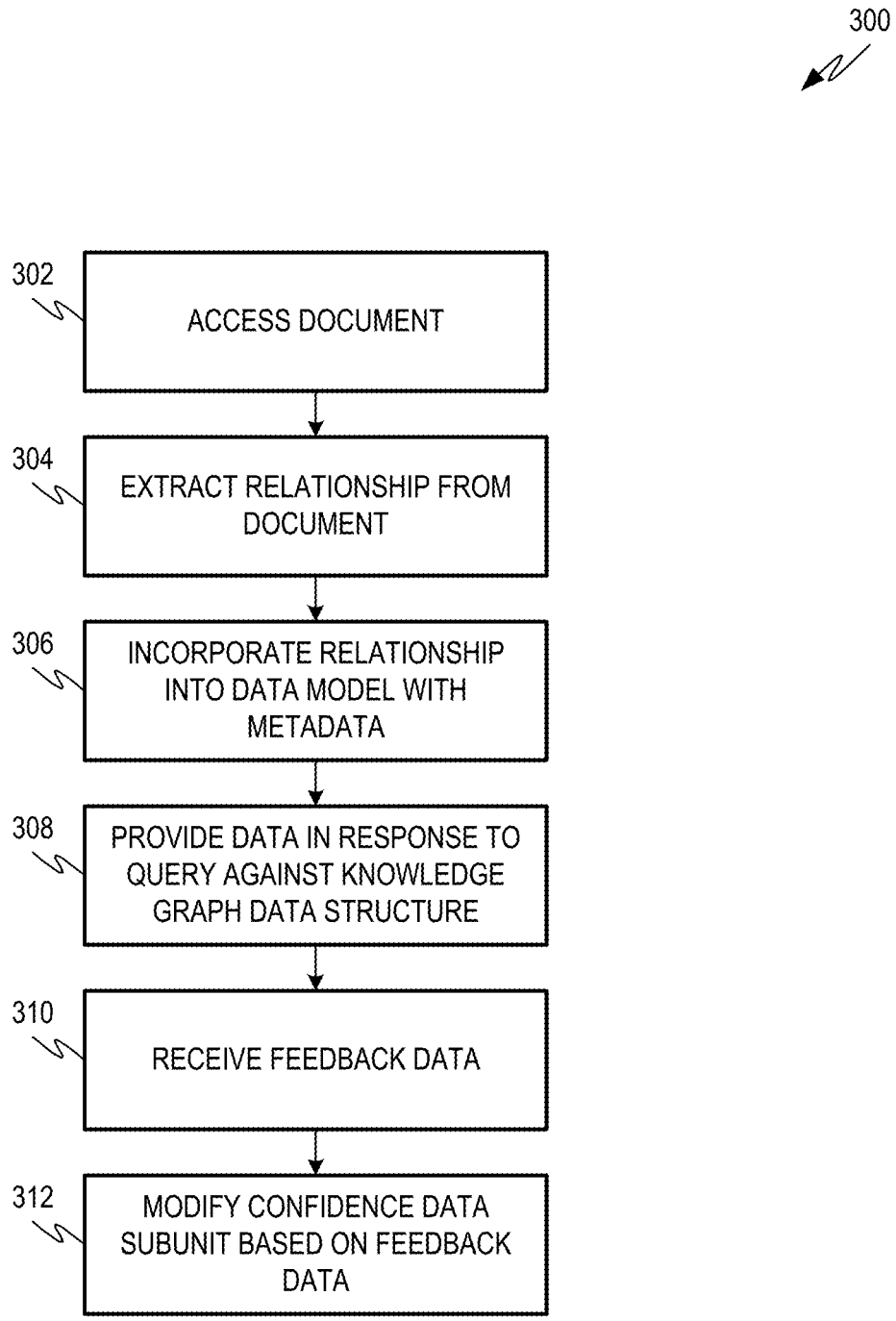
FIG. 3 is a flowchart showing one example of a process flow that may be executed in the environment of FIG. 1.

FIG. 3 is a flowchart showing one example of a process flow 300 that may be executed in the environment 100 of FIG. 1. For example, the process flow 300 may be executed, in whole or in part, by the knowledge graph computing system 102. At operation 302, the knowledge graph computing system 102 (e.g., the relationship extractor system 108 thereof) may access a document 110. At operation 304, the knowledge graph computing system 102 (e.g., the relationship extractor system 108 thereof) may extract a relationship from the document 110. The relationship may be extracted from the document 110 in any suitable manner. In some examples, the relationship extractor system 108 accesses the ontology subsystem 118 and retrieves entries from the ontology corresponding to words and/or phrases in the document 110. The relationship extractor system 108 may utilize the ontology entries to determine relationships represented by the language of the document 110. In other examples, the relationship extractor system 108 may implement a trained machine learning model. The relationship extractor system 108 may apply the trained machine learning model to the document 110 to return one or more relationships indicated by the text of the document 110.

At operation 306, the knowledge graph computing system 102 (e.g., the relationship extractor system 108 thereof) may incorporate the extracted relationship into the knowledge graph data structure 104. This may include, for example, writing a new triple data unit at the knowledge graph data structure 104 and/or modifying an existing triple data unit at the knowledge graph data structure 104. The operations 302, 304, 306 are described with respect to a single document 110. It will be appreciated, however, that operations 302, 304, 306 may be performed for multiple documents 110 either in series or in parallel.

At operation 308, the knowledge graph computing system 102 (e.g., the access layer subsystem 112 thereof) may provide data to a user 130 in response to a query against the knowledge graph data structure 104 made by the user 130. The access layer subsystem 112 may provide the results, for example, by serving a user interface page to the user 130 via the user computing device 128. Example user interface pages that may be used to provide query results to the user 130 are described herein with respect to FIGS. 8-10. The user interface page may include a description of the relationship or relationships from the knowledge graph data structure 104 that are responsive to the query. In some examples, the user interface page may also solicit feedback data from the user 130, where the feedback data describes a veracity of the relationship or relationships returned in response to the query.

The knowledge graph computing system 102 (e.g., the access layer subsystem 112 thereof) receives feedback data from the user 130 at operation 310. The feedback data may indicate the user's opinion of the veracity of the relationship or relationships provided. For example, if a relationship is true, the user may indicate that the relationship is true. If the relationship is not true or otherwise not useful to the user, this may also be indicated by the feedback data. In some examples, a user may indicate that a relationship is true, wrong, outdated, or does not fit the query made by the user.

The knowledge graph computing system 102 may utilize the feedback data to modify a confidence value for the returned relationship at operation 312. For example, as described herein, a triple data unit at the knowledge graph data structure 104 describing the relationship may include a confidence subunit storing a confidence value for the relationship. The knowledge graph computing system 102 may update the confidence value based on the feedback data and write the updated confidence value data to the confidence subunit of the appropriate triple data unit.

The confidence value for the relationship may be updated in various different ways. For example, if a user indicates that a relationship is false or wrong, the knowledge graph computing system 102 may decrease the confidence value for the relationship and write the decreased confidence value to the confidence subunit of the corresponding triple data unit. Equation [1] below shows one example way that the confidence value for a relationship may be decreased upon receiving negative user feedback:

$$c_t = c_t - t_u * d \quad [1]$$

In Equation [1], $c_t$ is the trust value for the relationship; $t_u$ is a trust score associated with the user providing the feedback data; and d is the maximum decrease in the confidence value that is permitted to occur based on feedback data from a single user.

If a user indicates that a relationship is true, the knowledge graph computing system may increase the confidence value for the relationship and write the increased confidence value of the confidence subunit of the corresponding triple data unit. Equation [2] below shows one example way that the confidence value for a relationship may be increased upon receiving positive user feedback:

$$c_t = c_t - t_u * i \quad [2]$$

In Equation [1], $c_t$ is the trust value for the relationship; $t_u$ is a trust score associated with the user providing the feedback data; and i is the maximum increase in the confidence value that is permitted to occur based on feedback data from a single user.

The trust score $t_u$ for a user, such as the user 130 or the administrative user 124, may be determined in various different ways. In some examples the trust score is initially determined based on a role of the user 124, 130 within the enterprise. In some examples, the trust score for a user may be updated based on relationships added to the knowledge graph data structure 104 by that user. For example, if a user 124, 130 adds a relationship that is determined to be false, the user's trust score may be decreased. On the other hand, if the user adds relationships that are determined to be true, the user's trust score may be increased.

Figure 4:
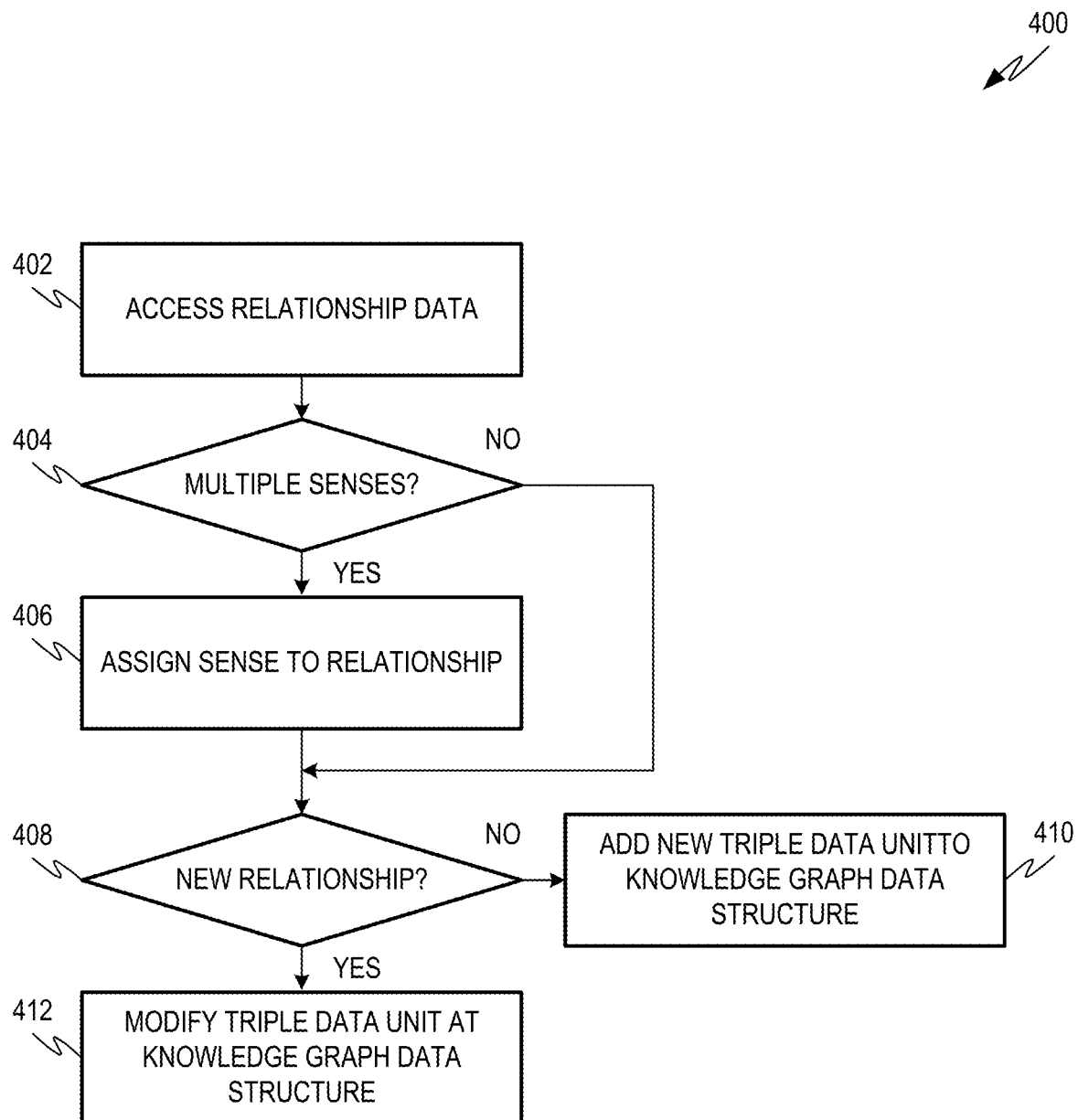
FIG. 4 is a flowchart showing one example of a process flow that may be executed by the knowledge graph computing system of FIG. 1 to incorporate extracted relationship data into the knowledge graph data structure.

FIG. 4 is a flowchart showing one example of a process flow 400 that may be executed by the knowledge graph computing system 102 of FIG. 1 to incorporate extracted relationship data into the knowledge graph data structure 104. The process flow 400 provides one example way of executing the operation 306 of the process flow 300.

At operation 402, the knowledge graph computing system 102 accesses relationship data describing a relationship. The relationship data may be accessed, for example, from the relationship extractor system 108 which may have extracted the relationship from a document 110. The relationship data may indicate a subject entity, a predicate, and an object of the relationship, which may be an entity or a literal.

At operation 404, the knowledge graph computing system 102 may determine if any of the elements of the relationship (e.g., the subject entity, the predicate, and/or the object) are expressed in language that could be interpreted in multiple senses. If the relationship does include one or more elements that can be expressed in multiple senses, the knowledge graph computing system 102 may utilize the sense dictionary subsystem 116 to assign a proper sense to the one or more elements of the relationship at operation 406. For example, the knowledge graph computing system 102 and/or the sense dictionary subsystem 116 may examine context words and/or phrases from the document 110. The context words and/or phrases may be matched with senses indicated at the sense dictionary subsystem 116. The determined sense for a subject entity may be written to the subject subunit of the corresponding triple data unit. The determined sense for a predicate may be written to the predicate subunit of the corresponding triple data unit. The determined sense for an object may be written to the object subunit of the corresponding triple data unit. It will be appreciated that one, two, or all three of the subject entity, the predicate, and the object may be assigned a sense.

At operation 408, the knowledge graph computing system 102 may determine if the extracted relationship is a new relationship or if it has already been described at the knowledge graph data structure 104 with an existing triple data unit. If the relationship has not yet been represented at the knowledge graph data structure 104, the knowledge graph computing system 102 may write a new triple data unit for the relationship to the knowledge graph data structure 104 at operation 410. The knowledge graph computing system 102 may populate the triple data unit and its various subunits with data describing the relationship. For example, the subject entity may be described by the subject subunit, the object may be described at the object subunit, and the predicate may be described at the predicate subunit.

In some examples, one or more entities of the newly extracted relationship may also be part of other relationships represented at the knowledge graph data structure 104 by other triple data units. For example, the subject entity of the extracted relationship may be a subject entity and/or an object of one or more other relationships. Similarly, if the object of the extracted relationship is an entity, then that object entity may be a subject or an object of one or more other relationships. When one or more entities of the newly extracted relationship are part of other relationships represented at the knowledge graph data structure 104 by other triple data units, knowledge graph computing system 102 may note the other relationships, for example, at the triple data units and/or at a separate storage location.

In some examples, the knowledge graph computing system 102 may also populate other subunits of the triple data unit. For example, the knowledge graph computing system 102 may determine an initial confidentiality level for the relationship. The initial confidentiality level may be determined in any suitable manner. In some examples, the ontology managed by the ontology subsystem 118 may indicate a confidentiality level of different types of relationships. The knowledge graph computing system 102 may consult the ontology subsystem 118 to determine the appropriate confidentiality level for the relationship, based on an indicated confidentiality level for relationships of the same type. In some examples, the confidentiality value is based on the document 110 from which the relationship was extracted. For example, the confidentiality of the relationship may be set equal to the confidentiality of the document 110 from which the relationship was extracted. The confidentiality value determined for the relationship may be written to a confidentiality subunit of the triple data unit.

In some examples, the knowledge graph computing system 102 (e.g., the confidence subsystem 114 thereof) determines the confidence value for the relationship. The confidence value for the extracted relationship may be determined in various different ways. In some examples, the extracted relationship may be verified by the administrative user 124 as described herein. In these examples, the confidence value for the extracted relationship may be set equal to a trust value associated with the administrative user 124 as given by Equation [3] below in which $c_t$ is the confidence value for the extracted relationship and $t_u$ is the trust level of the administrative user:

$$c_t = t_u \quad [3]$$

In some examples, a relationship may be added to the knowledge graph data structure 104 manually by the administrative user 124. In these examples, the confidence value for the relationship may also be determined according to Equation [3].

In some examples, the knowledge graph computing system 102 (e.g., the confidence subsystem 114 thereof) determines the confidence value for the relationship without considering an administrative user 124, for example, when the administrative user 124 does not verify an extracted relationship. For example, the confidence value may be determined based on various factors including a confidence value for the relationship extractor system 108 and a confidence value associated with an author of the document 110 from which the relationship was extracted. Equation [4] provides an example of how these factors may be considered:

$$c_t = \frac{(c_a + c_r)}{2 \times p} \quad [4]$$

In Equation [4], $c_a$ is a confidence value or trust score associated with an author of the document 110 from which the relationship was extracted. Also, $c_r$ is a confidence value associated with the relationship extractor system 108. This may indicate an accuracy of the algorithm being used by the relationship extractor system 108 to extract relationships from documents 110. In some examples, the relationship extractor system 108 may have different confidence values based on the algorithm used to extract the relationship. For example, when the relationship extractor system 108 is using an ontology from the ontology subsystem 118 to extract relationships, it may have one confidence value. When it is using a trained machine learning algorithm, it may have another different confidence value. The value p represents an optional punishing value. For example, the larger the punishing value p, the lower the confidence value determined for automatically extracted relationships.

Referring back to operation 408, if the extracted relationship is not a new relationship, then the knowledge graph computing system 102 may modify, at operation 412, an existing triple data unit at the knowledge graph data structure 104 based on the extracted relationship. For example, if the extracted relationship is not a new relationship, there may be an existing triple data unit at the knowledge graph data structure 104 representing the extracted relationship. The knowledge graph computing system, at operation 412, may update the existing triple data unit. For example, the knowledge graph computing system 102 may supplement the existing triple data unit to include data describing the document 110 from which the relationship was extracted. This may lead to a triple data unit indicating multiple documents 110, such as, for example, the example described with respect to FIG. 2.

The knowledge graph computing system 102 may also, in some examples, update the confidence value associated with the relationship at the existing triple data unit. For example, the knowledge graph computing system 102 may re-determine a confidence value for the relationship in view of the new extraction of the relationship from the document 110. For example, the knowledge graph computing system 102 may consider a confidence value for the relationship extractor system 108, confidence value or trust level of an author of the document 110, and or other suitable factors.

Figure 5:
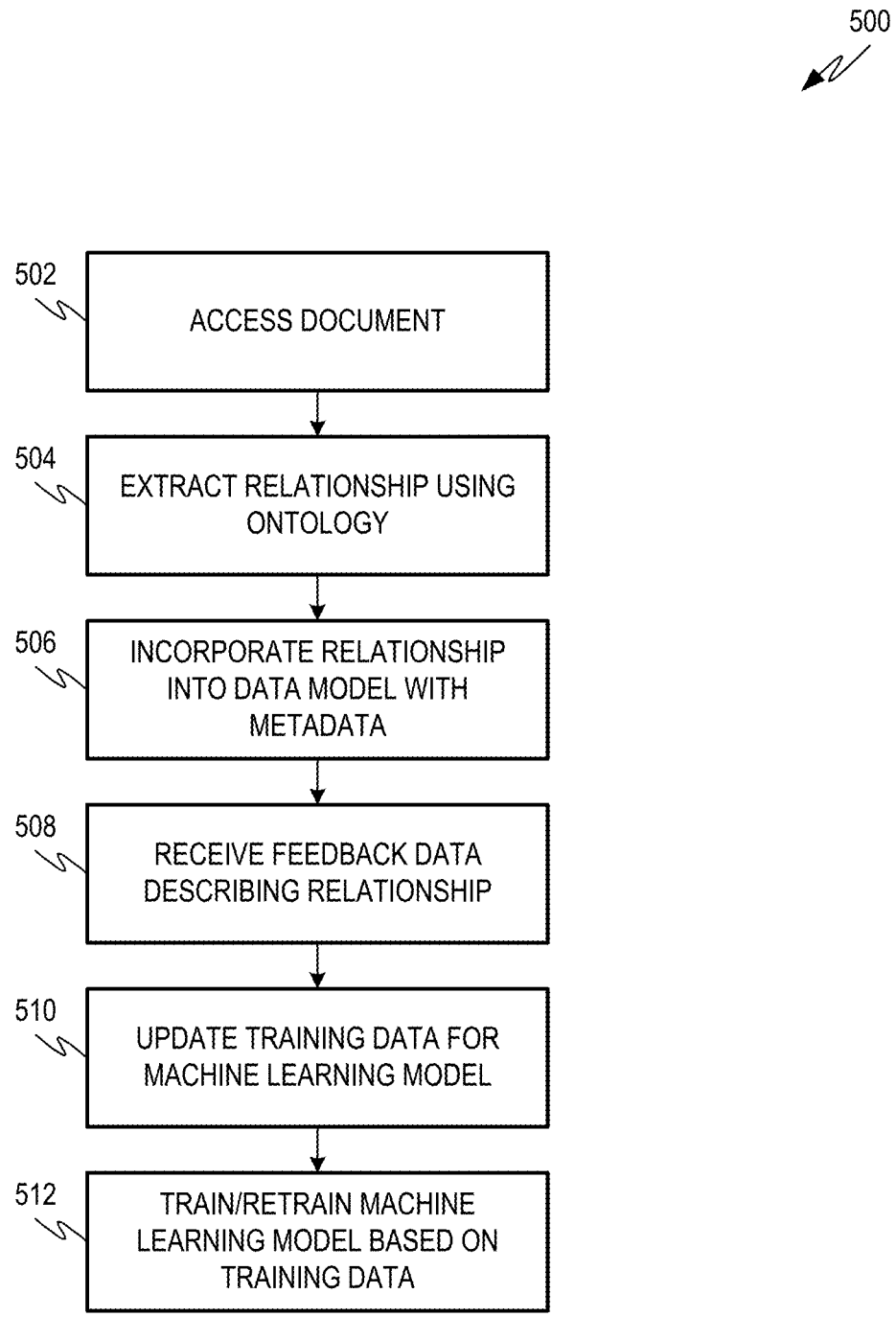
FIG. 5 is a flowchart showing one example of a process flow that may be executed by the knowledge graph computing system to generate and/or to supplement a knowledge graph data structure.

FIG. 5 is a flowchart showing one example of a process flow 500 that may be executed by the knowledge graph computing system 102 to generate and/or to supplement a knowledge graph data structure 104. At operation 502, the knowledge graph computing system 102 (the relationship extractor system 108 thereof) may access a document 110. At operation 504, the knowledge graph computing system 102 may extract a relationship from the document 110 using an ontology, such as an ontology managed by the ontology subsystem 118. The ontology may include words or phrases indicating relationships. The relationship extractor system 108 may find words and/or phrases in the document 110 that match the words or phrases in the ontology and extract relationships therefrom based on the ontology. Consider the following example. The ontology may indicate that the phrase "is a" represents a predicate linking a subject entity referenced prior to the predicate phrase and an object referenced after the predicate phrase. When the relationship extractor system 108 encounters said example text "Berlin is a city," it may apply the ontology to extract a relationship in which the subject entity is "Berlin," the predicate is "is a," and the object is "city."

At operation 506, the knowledge graph computing system 102 may incorporate the extracted relationship into the knowledge graph data structure 104, for example, as described herein with respect to the process flow 400. At operation 508, the knowledge graph computing system 102 may receive feedback data describing the relationship extracted at operation 504. For example, an enterprise user, such as the user 130, may make a query against the knowledge graph data structure 104 that returns the extracted relationship. The enterprise user may provide feedback data describing the relationship. The feedback data may indicate that the relationship is true, or may indicate that the relationship is not true, outdated, or otherwise not useful. If the enterprise user indicates that the relationship is true, the confidence value for the relationship may be updated at its corresponding triple data unit, e.g., the confidence subunit thereof. If the enterprise user indicates that the relationship is not true, outdated, or otherwise not useful, the confidence value for the relationship may be reduced.

At operation 510, the knowledge graph computing system 102 may update the training database 106 based on the feedback data received at operation 508. This may include modifying one or more labels at the training database 106. For example, the training database 106 may indicate the extracted relationship and may be labeled with various data including, for example, text from a document or documents 110 from which the relationship was extracted, and an indication of the confidence value for the relationship. Updating the training database 106 may include, for example, updating the confidence value associated with the relationship at training database 106. At operation 512, the knowledge graph computing system 102 may train and/or retrain a machine learning model to extract relationships from documents 110. When the machine learning model is trained, it may be used by the relationship extractor system 108 to extract additional relationships from documents 110.

Figure 6:
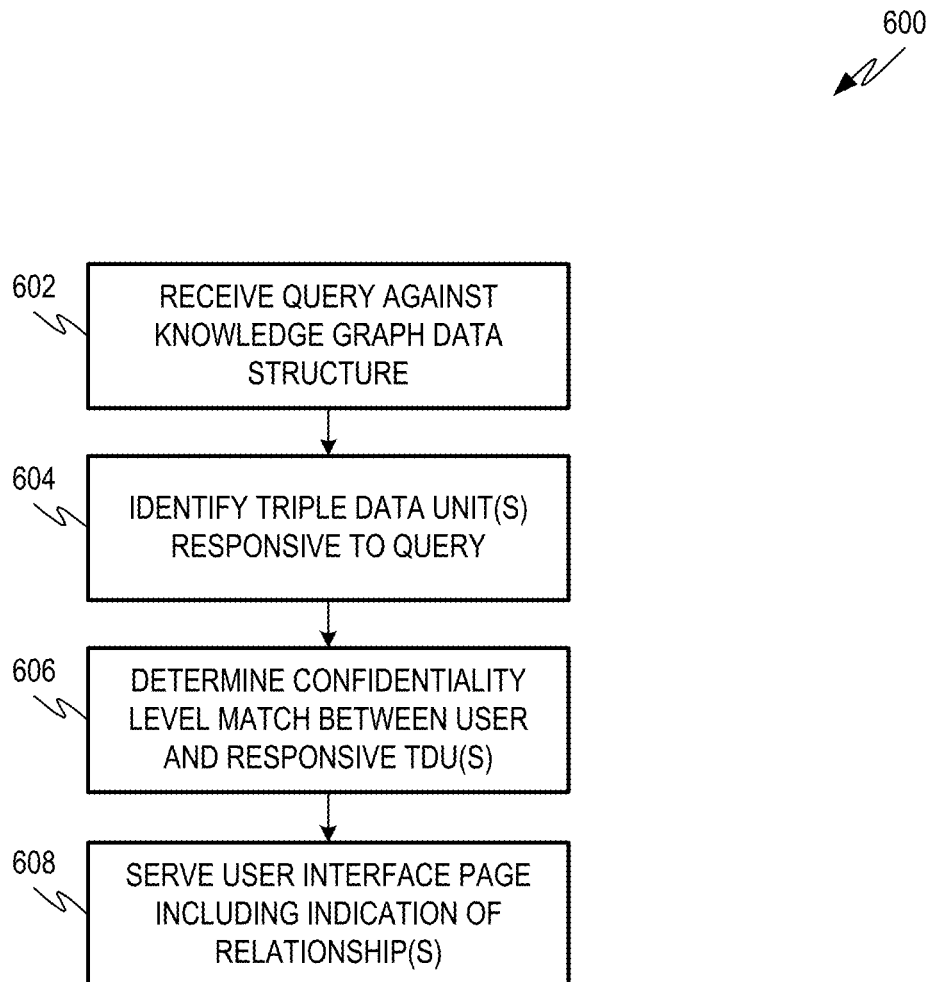
FIG. 6 is a flowchart showing one example of a process flow that may be executed by the knowledge graph computing system of FIG. 1 to respond to queries against the knowledge graph data structure from enterprise users, such as the enterprise user.

FIG. 6 is a flowchart showing one example of a process flow 600 that may be executed by the knowledge graph computing system 102 (e.g., the access layer subsystem 112 thereof) to respond to queries against the knowledge graph data structure 104 from enterprise users, such as the user 130. At operation 602, the access layer subsystem 112 may receive a query against the knowledge graph data structure 104. The query may have originated from the user 130 and may be received via the user computing device 128.

At operation 604, the access layer subsystem 112 may identify one or more triple data units at the knowledge graph data structure 104 that are responsive to the query. At operation 606, the access layer subsystem 112 may determine a confidentiality level match between the user 130 and any relationships that are responsive to the query. For example, enterprise users may have a confidentiality level indicating a level of confidential information that the user is permitted to see. A relationship stored at a triple data unit in the knowledge graph data structure (indicated "TDU" in FIG. 6) may also have a confidentiality level stored at a confidence subunit of the triple data unit. Determining the confidentiality level match may include determining whether the confidentiality level of the user 130 is sufficient to permit the user to view a returned relationship. If the user's confidentiality level does not meet the confidentiality level indicated by the triple data unit of a responsive relationship, that relationship may not be shown to the user.

At operation 608, the access layer subsystem 112 may serve a user interface page to the user 130 via the user computing device 128. The user interface page may include a representation of one or more relationships responsive to the user's query. The interface page may also include a prompt, such as, for example, a visual and/or a textual prompt. The prompt may solicit feedback data from the user.

Figure 7:
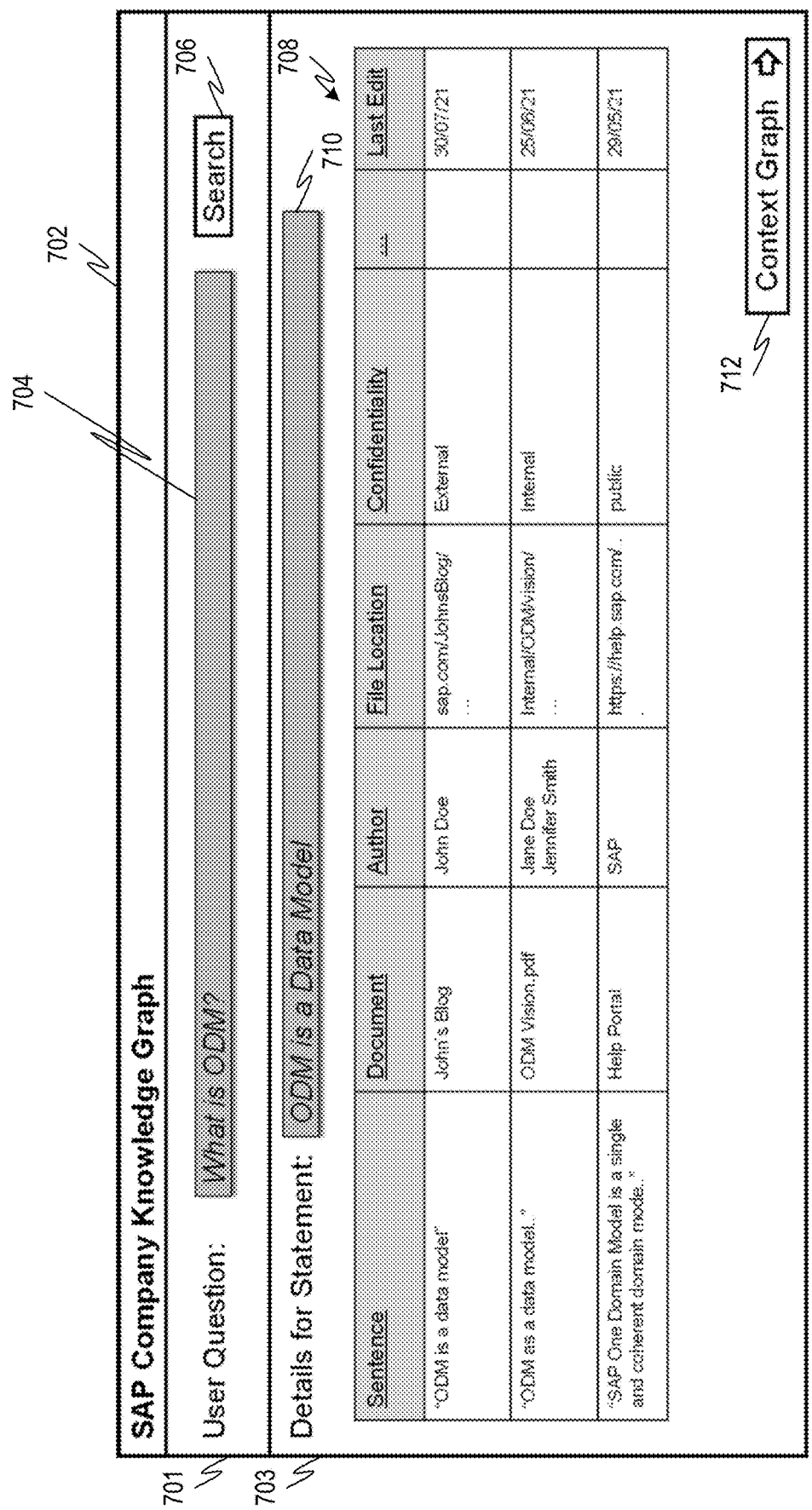
FIG. 7 is a diagram showing one example user interface page that may be provided to the user to facilitate a user query against the knowledge graph data structure.

FIG. 7 is a diagram showing one example user interface page 702 that may be provided to the user 130 to facilitate a user query against the knowledge graph data structure 104. The user interface page 702 may be provided to the user 130 via the user computing device 128. The user interface page 702 comprises a query field 701 with a text field 704 where the user 130 may enter a query or question to be executed against the knowledge graph data structure 104. The user 130 may initiate the query by selecting a search button 706.

The user interface page 702 also includes a result field 703. For example, a version of the user interface page 702 comprising the query field 701 only may be provided to the user to prompt the user to provide a query. In some examples, the full user interface page 702 including the query field 701 and the result field 703 may be provided with results of the user's query. The result field 703 indicates a relationship that is responsive to the user's query at a relationship field 710. The relationship indicated that the result field may include a subject entity, a predicate, and an object. The subject entity, predicate, and object may be read from the triple data unit associated with the relationship at the knowledge graph data structure 104. A metadata field 708 includes various metadata regarding the relationship indicated that the relationship field 710. Metadata at the metadata field 708 may also have been read from the triple data unit associated with the relationship at the knowledge graph data structure 104. In this example, the metadata includes sentences indicating the relationship from various documents 110 from which the relationship is extracted along with additional information about the documents including the document name, the document author, a location of the documents, a confidentiality level associated with the documents, and a last edit date for the documents.

Figure 8:
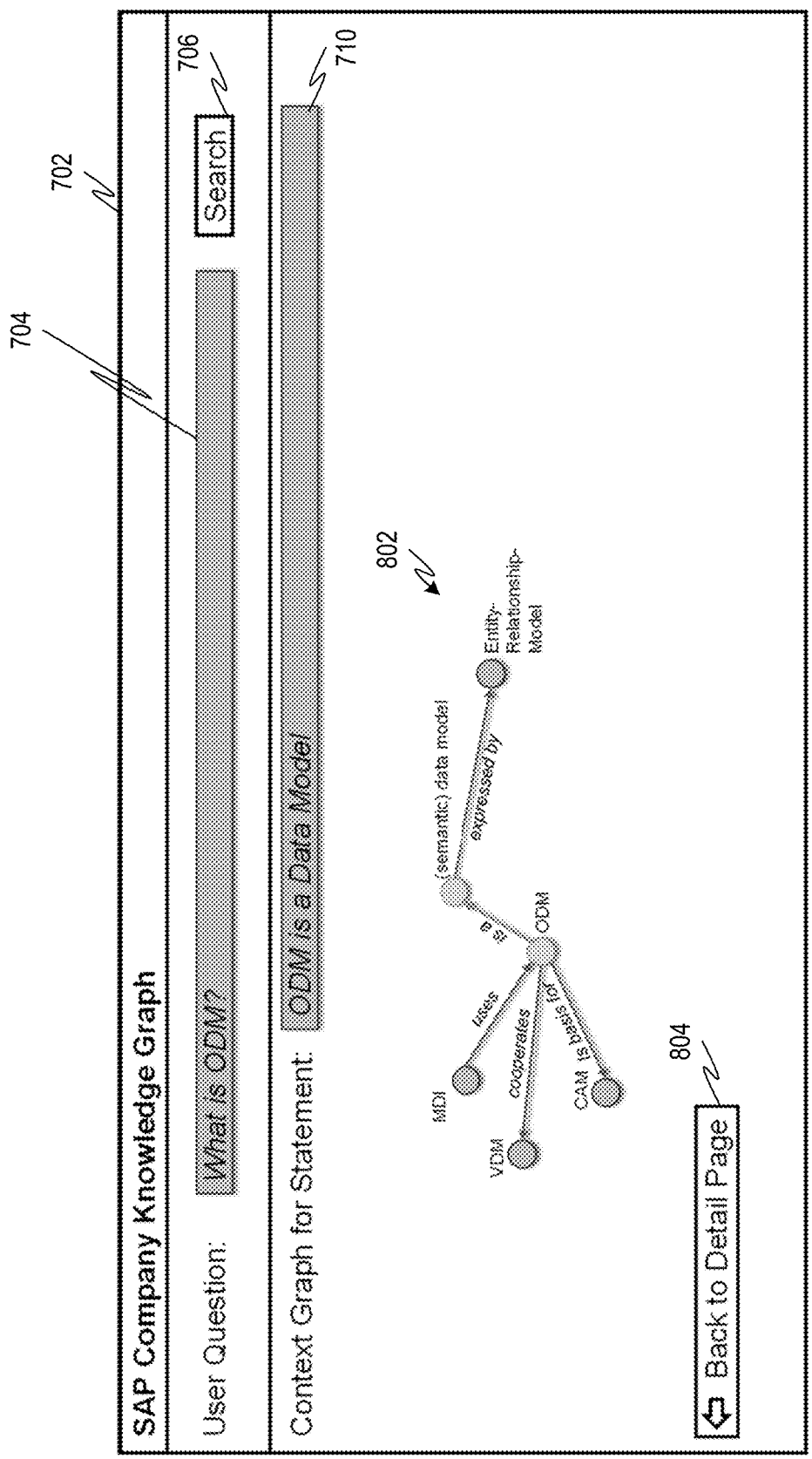
FIG. 8 is a diagram showing another example of the user interface page of FIG. 7.

The user interface page 702 also includes a Context Graph button 712. The user 130 may select the Context Graph button 712 to replace the metadata field 708 with the graphical representation of a portion of the knowledge graph including the relationship indicated in the relationship field 710. FIG. 8 is a diagram showing another example of the user interface page 702. The user interface page 702 may appear as depicted in FIG. 8, for example, when the user 130 selects the context graph button 712. In FIG. 8, the user interface page 702 includes the context graph field 802. The context graph field 802 graphically depicts a portion of the knowledge graph including the relationship indicated at relationship field 710. In some examples, the user may select a Back To Detail Page button 804 to return to the version of the user interface page 702 depicted in FIG. 7.

FIG. 9 is a diagram showing another example of a user interface page 902 that may be provided to the user 130. The user interface page 902 may be provided to the user 130 via the user computing device 128. The user interface page 902 comprises a query field 904 where the user 130 may enter a query or question to be executed against the knowledge graph data structure 104. The user 130 may initiate the query by selecting a Search button 906. The user interface page 902 also includes a result field 908. For example, a version of the user interface page 902 comprising the query field 904 may be provided to the user 130 only to prompt the user 130 to provide a query. In some examples, the full user interface page 902 including the query field 904 and the result field 908 may be provided with results of the user's query.

The result field 908 includes indications of three relationships that are potentially responsive to the user query indicated at the query field 904. Each relationship is indicated by a row at the result field 908. Additional entries in the row provide additional information about each of the potentially responsive relationships such as, for example, a Source Category, a Likeliness, a link that may be selected to provide Further Details about the relationship, and a Voting field soliciting feedback data. The relationships shown at the result field 908 may have been read from the knowledge graph data structure 104. For example, each relationship may be represented at the knowledge graph data structure 104 by a triple data unit, as described herein.

The Source Category associated with a relationship may indicate a source of the document 110 from which the relationship is extracted. In some examples, the Source Category may provide an indication of the confidentiality level associated with the relationship. For example, a Source Category of "internal" may only be available to users who are internal to the enterprise implementing the knowledge graph data structure 104. A Source Category indicating "external" may be available to users outside the enterprise as well.

The Likeliness value for a relationship may be an indication of the confidence value for the relationship, as described herein. In the example of FIG. 9, the Likeliness or confidence value is provided as a percentage. It will be appreciated, however, that a likeliness or confidence value may be provided in various other formats in addition to or instead of as a percent.

The Voting field, as shown, includes buttons that may be selected by the user to provide an indication of whether each indicated relationship is positive or negative. For example, the user 130 may select the buttons showing a check to indicate that the corresponding relationship is true and responsive to the user's query. The user 130 may select the button and ask to indicate that the corresponding relationship is either false or not responsive to the user's query.

FIG. 10 shows another example of the user interface page 902 including a feedback window 1002. In some examples, the feedback window 1002 may be shown to the user 130 when the user selects the negative feedback button from the voting field of a relationship. The feedback window 1002 prompts user 130 to indicate whether the relationship does not fit the user's query, is outdated, or is wrong. In the example of FIG. 10, the feedback window 1002 also includes a field where the user may enter an "other" statement indicating why a given relationship is negative. As described herein, the knowledge graph computing system 102 may modify the confidence value of a relationship based on the feedback data that may be provided such as, for example, as shown in FIGS. 9 and 10.

In some examples, a user, such as the user 130, may make a time-dependent query against the knowledge graph data structure 104. A time-dependent query may be a query having a result that depends on the veracity of at least one test relationship at a test point-in-time. Consider the following example query: "Was Elizabeth II Queen of the United Kingdom in 1967?" This example query against the knowledge graph data structure 104 may be a time-dependent query testing whether the relationship "Elizabeth II is Queen of the United Kingdom" is true at a test point-in-time, which in this example is 1967. Time-dependent queries may also be used, as described herein, for various other purposes including, for example, to verify relationships before the relationships are added to the knowledge graph data structure 104, and/or to verify relationships that have already been included in the knowledge graph data structure 104.

Figure 11:
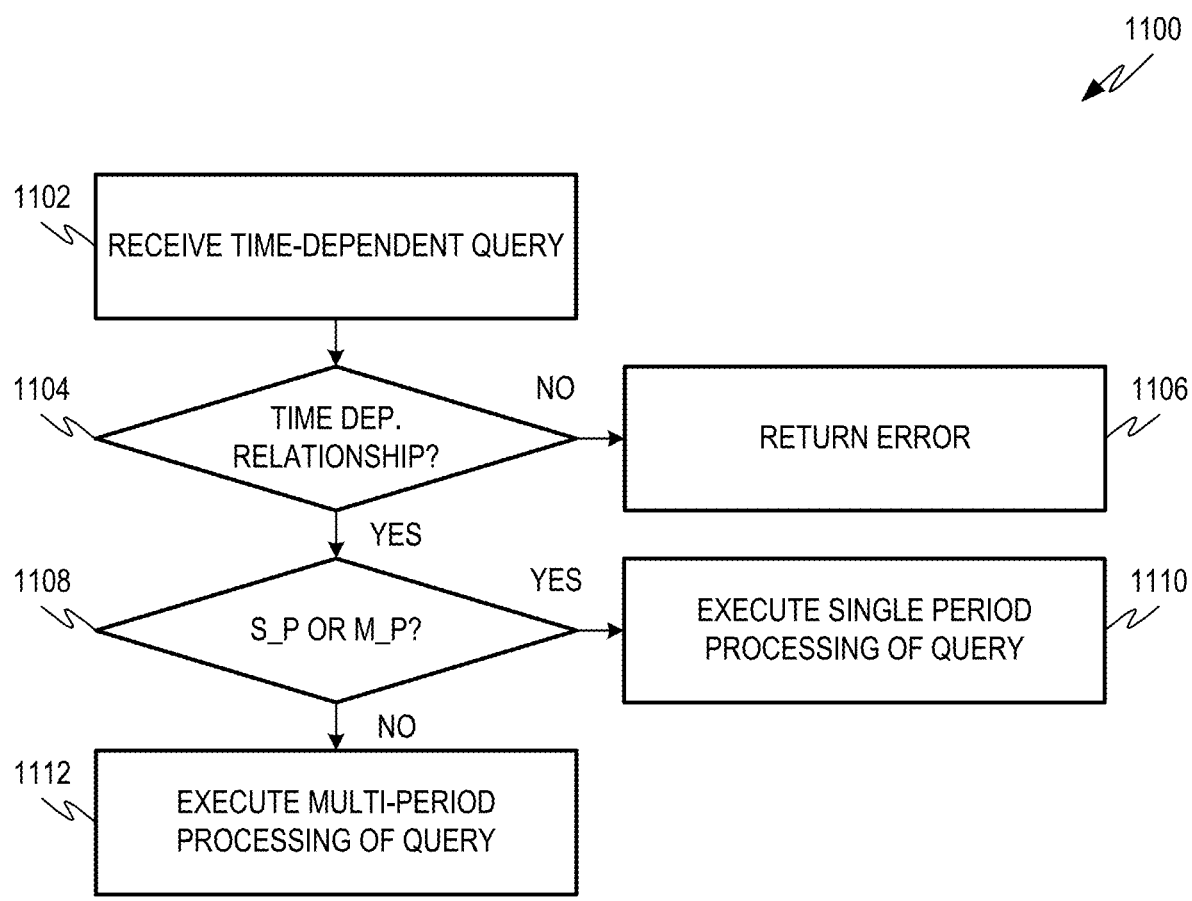
FIG. 11 is a flowchart showing one example of a process flow that may be executed by the knowledge graph computing system of FIG. 1 to respond to a time-dependent query against the knowledge graph data structure.

In some examples, the knowledge graph computing system 102 is configured to respond to time-dependent queries using the knowledge graph data structure 104. FIG. 11 is a flowchart showing one example of a process flow 1100 that may be executed by the knowledge graph computing system 102 to respond to a time-dependent query against the knowledge graph data structure 104.

At operation 1102, the knowledge graph computing system 102 may receive a time-dependent query against the knowledge graph data structure 104. The time-dependent query may indicate a test relationship and a test point-in-time. At operation 1104, the knowledge graph computing system 102 may determine if the test relationship is a time-dependent relationship. This may include consulting the ontology managed by the ontology subsystem 118, for example, by querying the ontology subsystem 118. If the test relationship is not time-dependent, the knowledge graph computing system 102 may return an error in response to the time-dependent query at operation 1106.

If the test relationship is time-dependent, then the knowledge graph computing system 102 may determine, at operation 1108, whether the test relationship is single-period time-dependent (indicated as S_P in FIG. 11) or multi-period time-dependent (indicated at M_P in FIG. 11). This may be performed, for example, using the ontology. For example, the ontology may indicate whether it is single-period time-dependent and or multi-period time-dependent. If the test relationship is single-period time-dependent, then the knowledge graph computing system 102 may execute single-period processing of the query at operation 1110. Examples describing single-period processing of the time-dependent query are described herein with respect to FIGS. 12-18. If the test relationship is multi-period time-dependent, then the knowledge graph computing system 102 may execute multi-period processing of the query at operation 1112. Examples describing multi-period processing of the time-dependent query are described herein with respect to FIG. 19.

Figure 12:
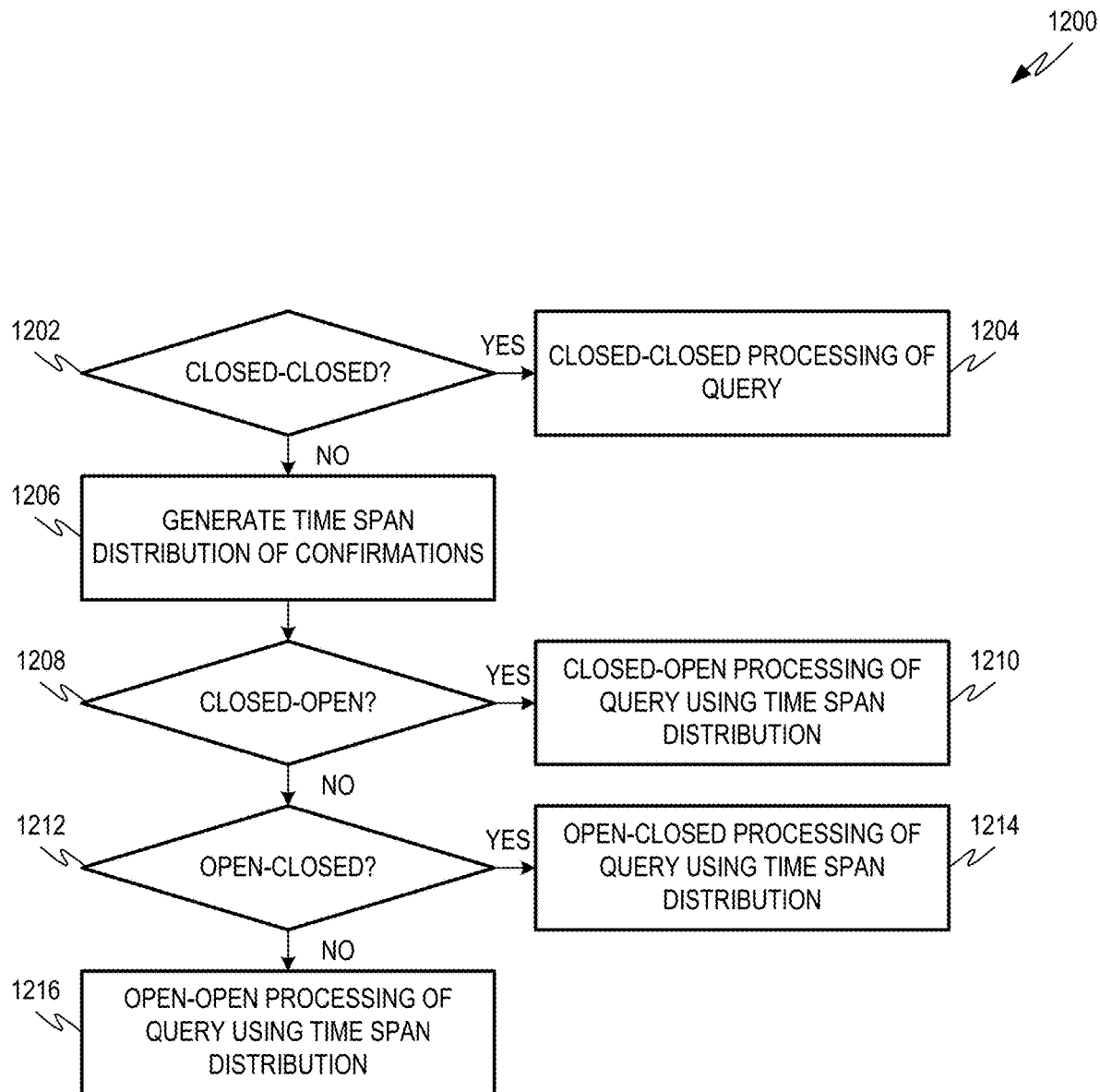
FIG. 12 is a flowchart showing one example of a process flow that may be executed by the knowledge graph computing system of FIG. 1 to perform single-period processing of a time-dependent query.

FIG. 12 is a flowchart showing one example of a process flow 1200 that may be executed by the knowledge graph computing system 102 to perform single-period processing of a time-dependent query. The process flow 1200 is one example way that the knowledge graph computing system 102 may perform operation 1110 of the process flow 1100.

The process flow 1200 may process time-dependent queries with single-period test relationships based on whether the boundaries of the single period are open or closed. A boundary may be closed if the knowledge graph data structure 104 includes a date indicating a date for the boundary. Consider again the example relationship "lived." If the test relationship includes the predicate "lived," then a beginning boundary of the test relationship may be closed if the knowledge graph data structure 104 indicates a relationship "was born on" having the same subject entity as the test relationship. An end boundary for the test relationship may be closed if the knowledge graph data structure 104 indicates a relationship "died in" having the same subject entity as the test relationship. In some examples, a test relationship may be closed-closed, open-closed, closed-open, or open-open. If the test relationship is closed-closed, both the beginning and the end of the single period are closed or defined. If the test relationship is closed-open, then a beginning boundary of the single period may be closed or defined while an end boundary of the single period may not be defined. If the test relationship is open-closed, then an end boundary of the single period may be closed or defined while the beginning boundary of the single period may not be defined. If the test relationship is open-open, then neither boundary of the single period may be defined.

At operation 1202, the knowledge graph computing system 102 may determine if the test relationship is closed-closed. If the test relationship is closed-closed, then the knowledge graph computing system 102 may perform closed-closed processing of the query at operation 1204, for example, as described herein with respect to FIG. 13.

If the test relationship is not closed-closed, then the knowledge graph computing system 102 may, at operation 1206, utilize one or more confirmation points-in-time associated with the test relationship to generate a time span distribution describing the test relationship. This may include, for example, fitting a probability distribution to the confirmation points-in-time. The confirmation points-intime are points-in-time at which the test relationship is known or believed to be true. The confirmation points may be stored, for example, at a time subunit of the triple data unit associated with the test relationship at the knowledge graph data structure 104. In some examples, the knowledge graph computing system 102 accesses the confirmation points-in-time from other triple data units at the knowledge graph data structure 104. For example, the ontology managed by the ontology subsystem 118 may describe other relationships that, if based on the same subject entity and/or object, indicate the truth or falsity of the test relationship. The knowledge graph computing system 102 may execute one or more queries against the knowledge graph data structure 104 to locate triple data units indicating relationships that provide confirmation points-in-time for the test relationship.

The distribution may be any suitable probability distribution such as, for example, a normal distribution, a Gaussian distribution, and/or the like. The knowledge graph computing system 102 may generate the probability distribution based on the relationships indicated at the knowledge graph data structure 104. For example, the mean of the probability distribution may be determined based on the mean date/time of the confirmation points-in-time. The variance of the probability distribution may also be determined from the confirmation points-and-time. In some examples, the confirmation points-in-time may be drawn from knowledge graph data structures stored by other tenants at a cloud environment, as described herein below. This may increase the number of confirmation points-in-time used to generate the probability distribution and, thereby, may increase the accuracy of the probability distribution.

At operation 1208, the knowledge graph computing system 102 may determine if the test relationship is closed-open. If the test relationship is closed-open, then at operation 1210 the knowledge graph computing system 102 may perform closed-open processing of the query using the time span distribution determined at 1206. An example of closed-open processing is provided herein with respect to FIG. 14. If the test relationship is not closed-open, then the knowledge graph computing system may, at operation 1212, determine whether the test relationship is open-closed. If the test relationship is open-closed, then the knowledge graph computing system 102 may perform open-closed processing of the query using the time span distribution at operation 1214. An example of open-closed processing is provided herein with respect to FIG. 16. If the test relationship is not open-closed, then the test relationship may be open-open. The knowledge graph computing system 102 may perform open-open processing of the query using the time span distribution at operation 1216. An example of open-open processing is provided herein with respect to FIG. 18.

Figure 13:
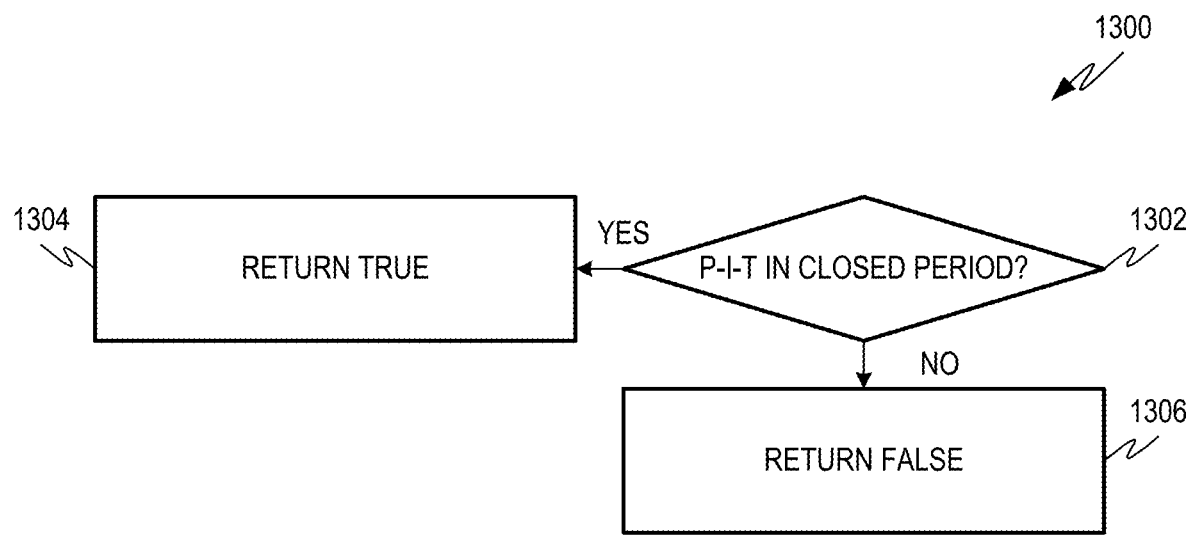
FIG. 13 is a flowchart showing one example of a process flow that may be executed by the knowledge graph computing system of FIG. 1 to perform closed-closed processing of a time-dependent query against the knowledge graph data structure.

FIG. 13 is a flowchart showing one example of a process flow 1300 that may be executed by the knowledge graph computing system 102 to perform closed-closed processing of a time-dependent query against the knowledge graph data structure 104. At operation 1302, the knowledge graph computing system 102 may determine whether the test point-in-time (indicated as "P-I-T" in FIG. 13) is within the closed time period of the test relationship. For example, the knowledge graph computing system 102 may determine whether the test point-in-time is after a defined beginning of the time period and before a defined end of the time period. If the test point-in-time is in the closed time period of the relationship, then the knowledge graph computing system 102 may, at operation 1304, return an indication that the test relationship is true at the test point-in-time. If the test point-in-time is not in the closed time period of the test relationship, then the knowledge graph computing system 102 may, at operation 1306, return an indication that the test relationship is false at the test point-in-time. The indication that the test relationship is true or false at the test point-in-time may make up all or a portion of a response to the time-dependent query. The knowledge graph computing system 102 may send the response to the time-dependent query to the computing device that made the time-dependent query, such as, for example, a user computing device of a user, the query assistant system 120, and/or the like.

Figure 14:
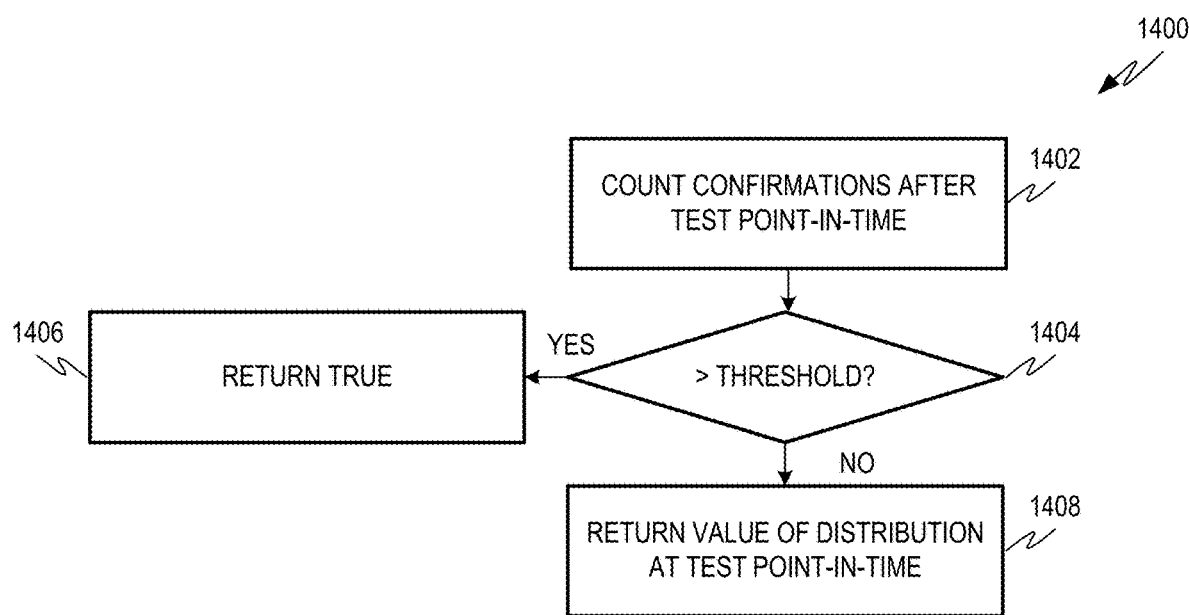
FIG. 14 is a flowchart showing one example of a process flow that may be executed by the knowledge graph computing system of FIG. 1 to perform closed-open processing of a time-dependent query against the knowledge graph data structure.

FIG. 14 is a flowchart showing one example of a process flow 1400 that may be executed by the knowledge graph computing system 102 to perform closed-open processing of a time-dependent query against the knowledge graph data structure 104. In this example, a beginning boundary of the time period of the test relationship is defined or closed, but the end boundary is not defined or closed. The process flow 1400 shows one example manner in which the operation 1210 of process flow 1200 may be executed.

At operation 1402, the knowledge graph computing system 102 may count a number of confirmation points-in-time for the test relationship that occur after the test point-in-time. For example, confirmation points-in-time for the test relationship occurring after the test point-in-time may tend to indicate that the test relationship is true at the test point-in-time. If the number of confirmation points-in-time for the test relationship occurring after the test point-in-time is greater than the threshold at operation 1404, then the knowledge graph computing system 102 may, at operation 1406, return an indication that the test relationship is true at the test point-in-time.

If the number of confirmation points-in-time for the test relationship occurring after the test point-in-time is not greater than the threshold, then the knowledge graph computing system 102 may, at operation 1408, return a value of the probability distribution of confirmation points-in-time as a veracity of the test relationship at the test point-in-time.

Figure 15:
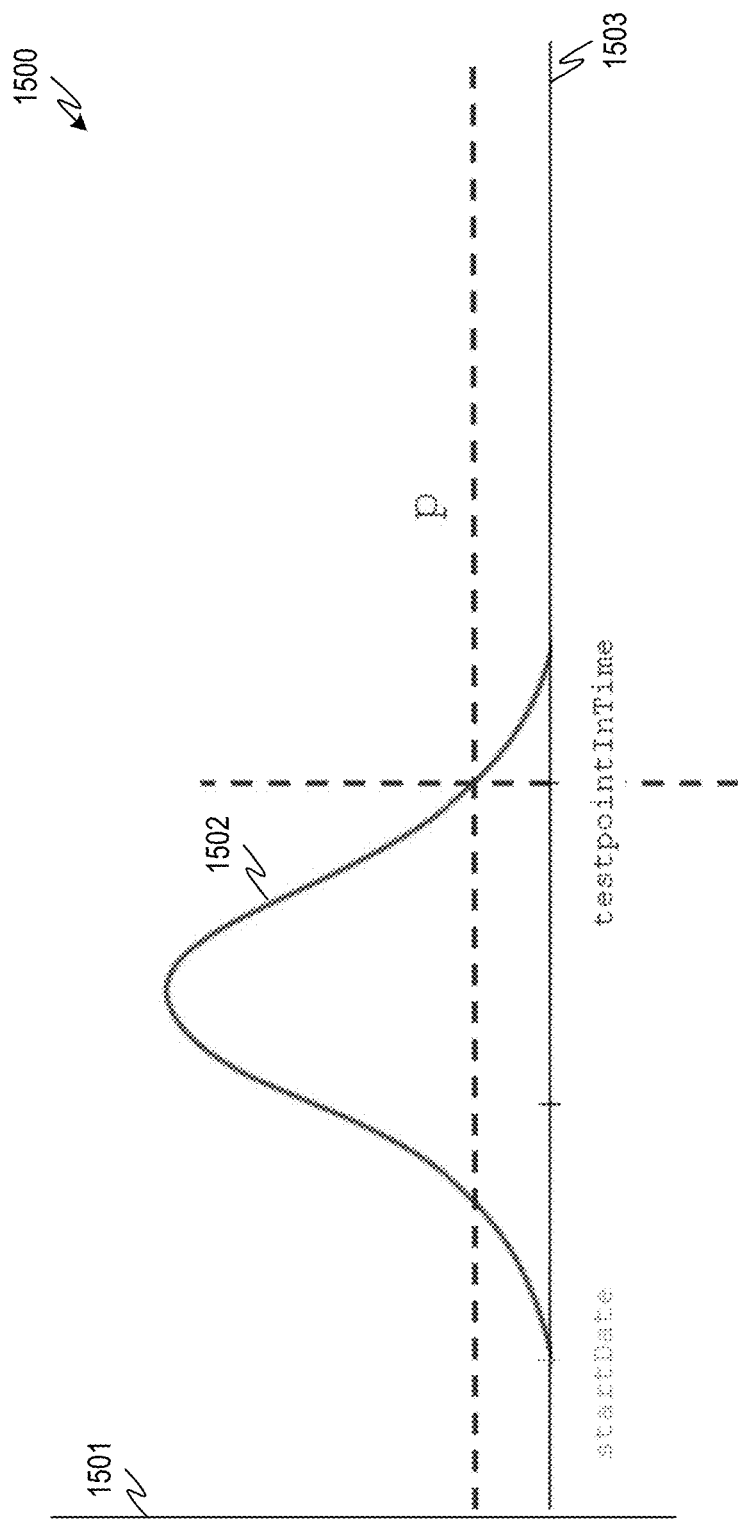
FIG. 15 is a diagram showing one example of a probability distribution based on confirmation points for a test relationship.

FIG. 15 is a diagram 1500 showing one example of a probability distribution 1502 based on confirmation points for a test relationship. The probability distribution 1502 is shown relative to a horizontal axis 1503 and a vertical axis 1501. The horizontal axis 1503 indicates time. The vertical axis 1501 indicates a probability that the test relationship is true at the time indicated by the horizontal axis 1503. As described herein, the probability distribution 1502 may be generated based on the confirmation points-in-time for the test relationship and may be based on any suitable distribution.

The diagram 1500 illustrates one example way that the operation 1408 of the process flow 1400 may be performed. For example, the test relationship represented by the probability distribution 1502 is closed-open. Accordingly, the distribution is positioned such that the probability exceeds zero at a start date indicated by "startDate." The test point-in-time is indicated on the horizontal axis 1503 by "testpointInTime." Accordingly, in the example of FIG. 15, returning the value of the probability distribution 1502 at the test point-in-time may include returning the value indicated by "p."

Figure 16:
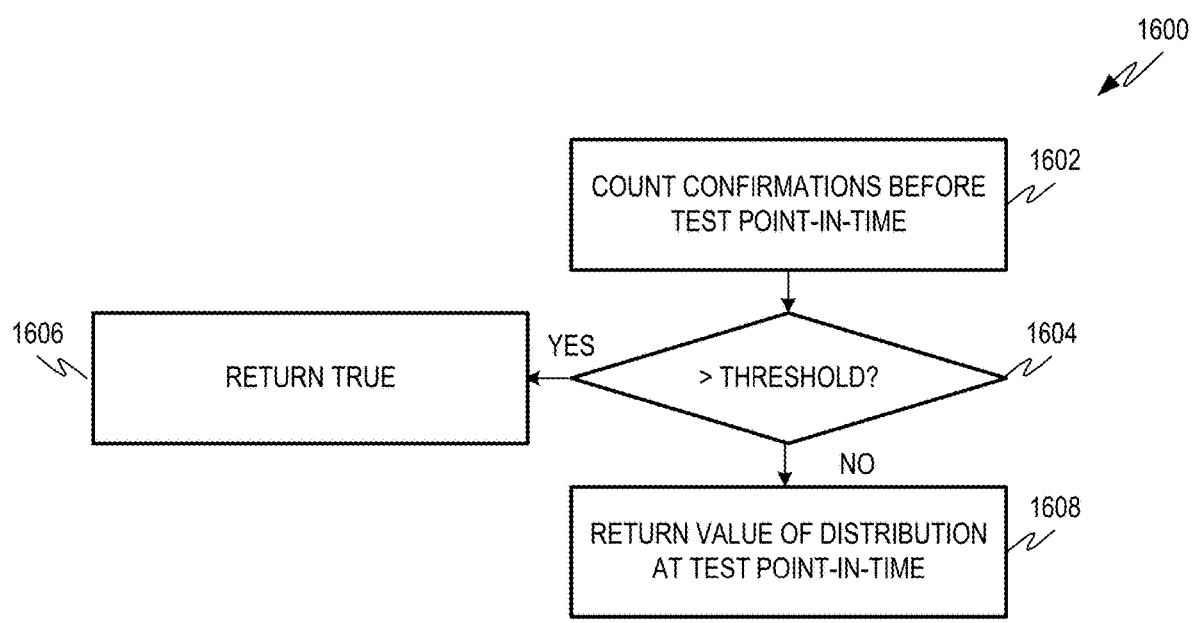
FIG. 16 is a flowchart showing one example of a process flow that may be executed by the knowledge graph computing system of FIG. 1 to perform open-closed processing of a time-dependent query against the knowledge graph data structure.

FIG. 16 is a flowchart showing one example of a process flow 1600 that may be executed by the knowledge graph computing system 102 to perform open-closed processing of a time-dependent query against the knowledge graph data structure 104. In this example, an end boundary of the time period of the test relationship is defined or closed, but the beginning boundary is not defined or closed. The process flow 1600 shows one example manner in which the operation 1214 of process flow 1200 may be executed.

At operation 1602, the knowledge graph computing system 102 may count a number of confirmation points-in-time for the test relationship that occur before the test point-in-time. For example, confirmation points-in-time for the test relationship occurring before the test point-in-time may tend to indicate that the test relationship is true at the test point-in-time. If the number of confirmation points-in-time for the test relationship occurring before the test point-in-time is greater than the threshold at operation 1604, then the knowledge graph computing system 102 may, at operation 1606, return an indication that the test relationship is true at the test point-in-time.

If the number of confirmation points-in-time for the test relationship occurring before the test point-in-time is not greater than the threshold, then the knowledge graph computing system 102 may, at operation 1608, return a value of the probability distribution of confirmation points-in-time as a veracity of the test relationship at the test point-in-time.

Figure 17:
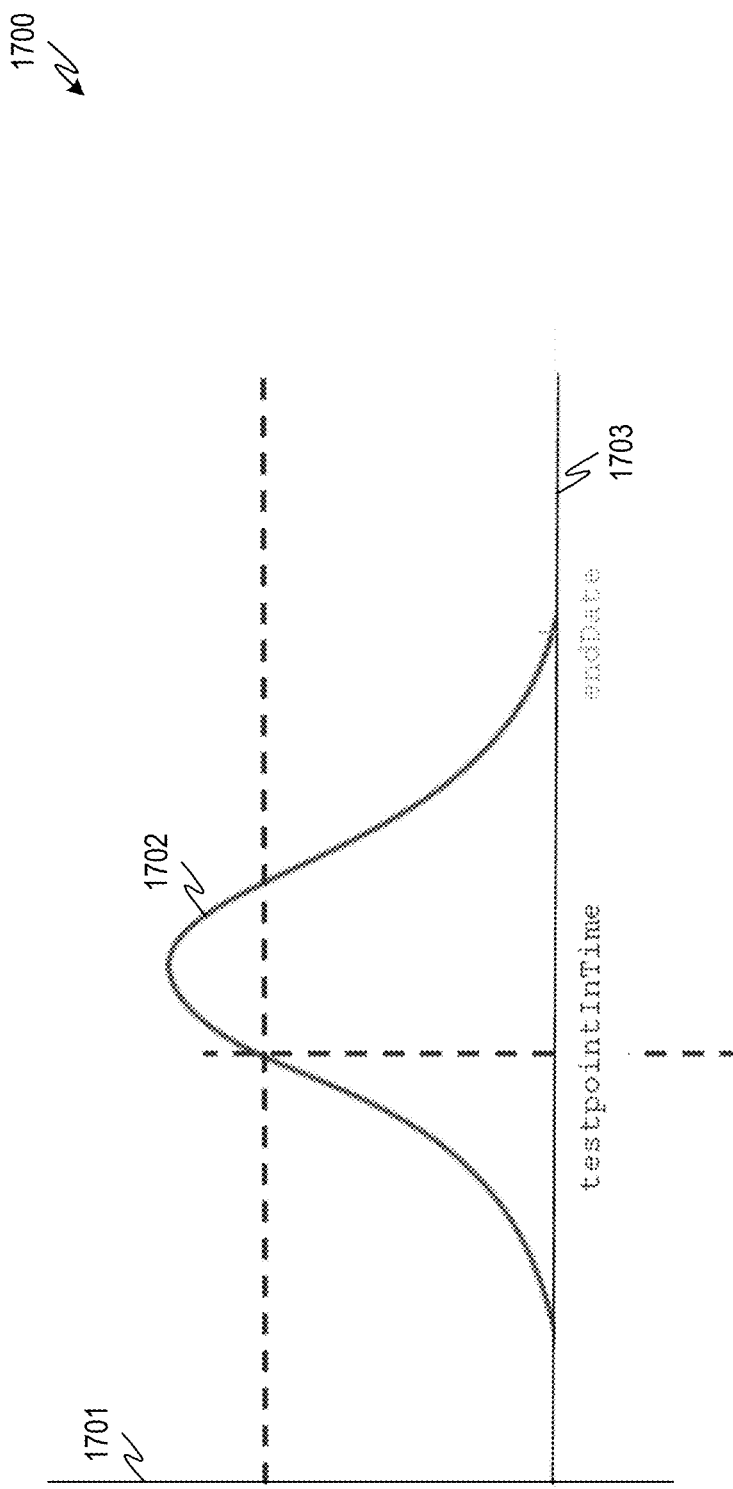
FIG. 17 is a diagram showing one example of a probability distribution based on confirmation points for a test relationship.

FIG. 17 is a diagram 1700 showing one example of a probability distribution 1702 based on confirmation points for a test relationship. The probability distribution 1702 is shown relative to a horizontal axis 1703 and a vertical axis 1701. The horizontal axis 1703 indicates time. The vertical axis 1701 indicates a probability that the test relationship is true at the time indicated by the horizontal axis 1703. As described herein, the probability distribution 1702 may be generated based on the confirmation points-in-time for the test relationship and may be based on any suitable distribution.

The diagram 1700 illustrates one example way that the operation 1608 of the process flow 1600 may be performed. For example, the test relationship represented by the probability distribution 1702 is open-closed. Accordingly, the distribution is position such that the probability drops to zero at an end date indicated by "endDate." The test point-in-time is indicated on the horizontal axis 1703 by "testpointIn-Time." Accordingly, in the example of FIG. 17, returning the value of the probability distribution 1702 at the test point-in-time may include returning the value indicated by "p."

Figure 18:
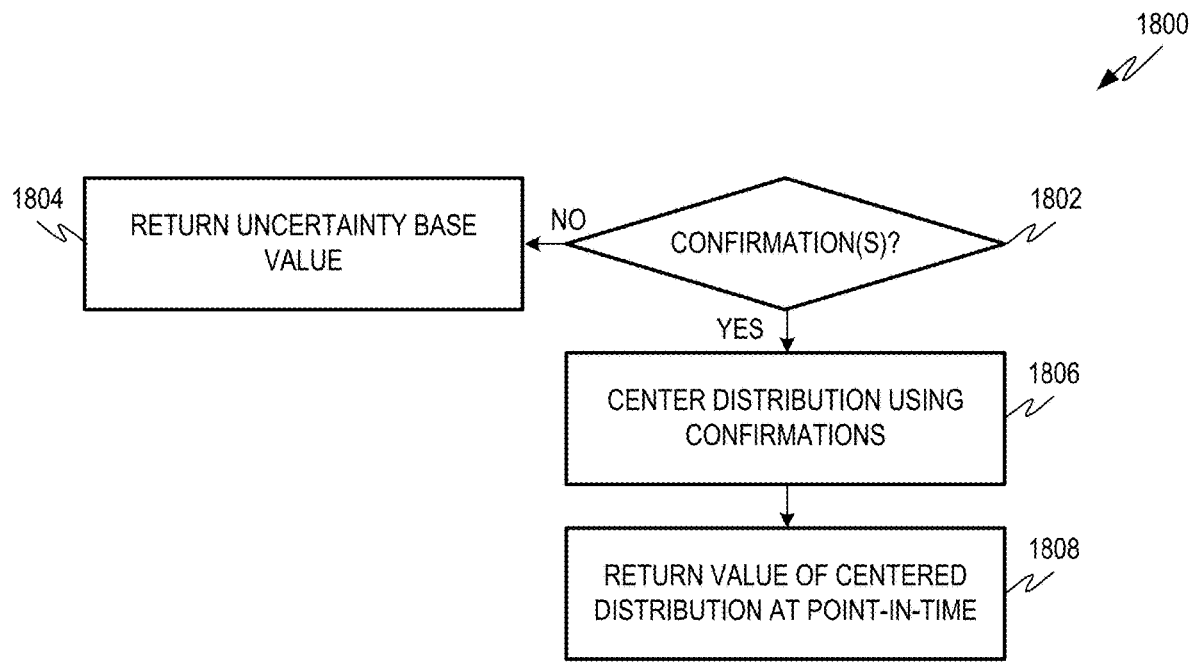
FIG. 18 is a flowchart showing one example of a process flow that may be performed by the knowledge graph computing system of FIG. 1 to perform open-open processing of a time-dependent query against the knowledge graph data structure.

FIG. 18 is a flowchart showing one example of a process flow 1800 that may be performed by the knowledge graph computing system 102 to perform open-open processing of a time-dependent query against the knowledge graph data structure 104. For example, the process flow 1800 shows one example manner in which the operation 1216 of the process flow 1200 may be performed. In this example, neither an end boundary nor a beginning boundary of the time period of the test relationship is defined or closed. Instead, both are open.

At operation 1802, the knowledge graph computing system 102 may determine if there are any confirmation points-in-time for the test relationship. For example, the knowledge graph computing system 102 may consult a time subunit of the triple data unit describing the test relationship to determine if it indicates any confirmation points-in-time. If there are no confirmation points-in-time for the test relationship, the knowledge graph computing system 102 may, at operation 1804, return an uncertainty base value as the probability that the test relationship is true at the test point-in-time. The uncertainty base value may be a value indicating that the knowledge graph data structure 104 does not indicate a likelihood that the test relationship is true at the test point-in-time. In some examples, the uncertainty base value may be 0.5 or 50%.

If there are one or more confirmation points-in-time for the test relationship, the knowledge graph computing system 102, at operation 1806, may center the probability distribution determined at operation 1206. This may include positioning a mean of the probability distribution at an average time of the confirmation points-in-time for the test relationship. If there is only a single confirmation point-in-time for the test relationship, this may involve positioning the mean of the probability distribution at the confirmation point-in-time. If there are multiple confirmation points-in-time for the test relationship, this may include positioning the mean of the probability distribution at an average time of the confirmation points-in-time. At operation 1808, the knowledge graph computing system 102 may return the value of the centered probability distribution at the test point-in-time as the probability that the test relationship is true at the test point-in-time.

Figure 19:
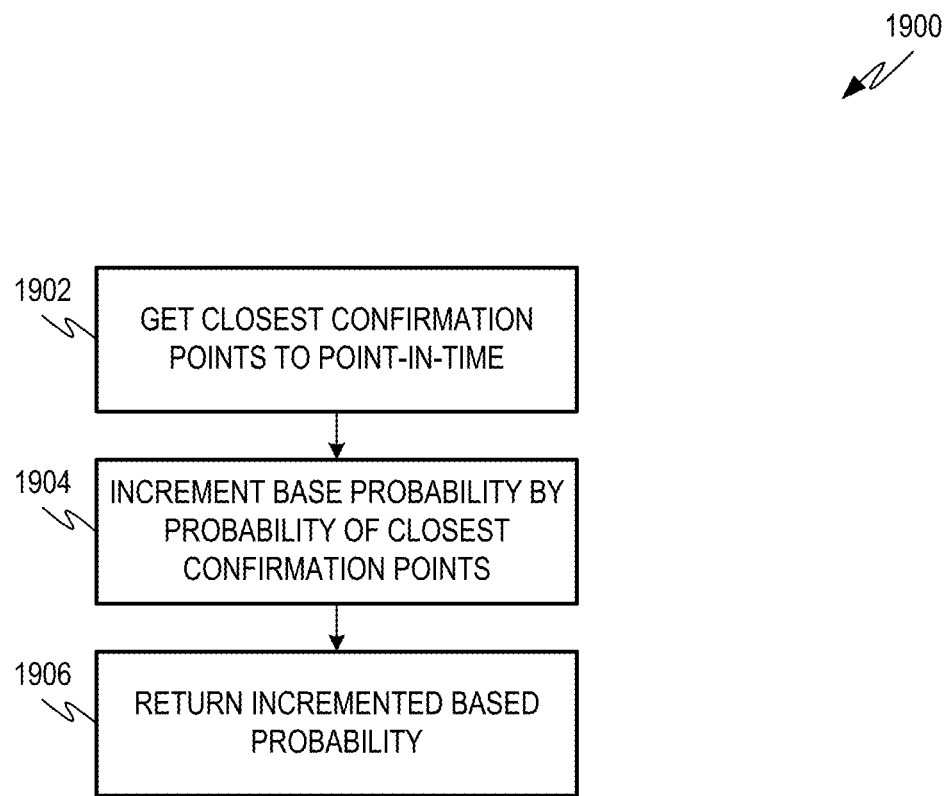
FIG. 19 is a flowchart showing one example of a process flow that may be executed by the knowledge graph computing system of FIG. 1 to execute multi-period processing of a time-dependent query against the knowledge graph data structure.

FIG. 19 is a flowchart showing one example of a process flow 1900 that may be executed by the knowledge graph computing system 102 to execute multi-period processing of a time-dependent query against the knowledge graph data structure 104. For example, the process flow 1900 shows one example manner of executing the operation 1112 of the process flow 1100.

At operation 1902, the knowledge graph computing system 102 may determine a set of confirmation points-in-time that are closest to the test point-in-time. In some examples, this includes selecting a single confirmation point-in-time that is the closest after the test point-in-time and a single confirmation point-in-time that is the closest before the test point-in-time. Also, in some examples, this may include selecting the closest n points-in-time after the test point-in-time and the closest n points-in-time before the test point-in-time.

At operation 1904, the knowledge graph computing system 102 may increment a base probability by the probability of each of the closest confirmation points-in-time selected at operation 1902. The base probability may be any suitable probability such as, for example, 0.5 or 50%. In some examples, the operation 1904 may be performed according to the Equation [5] below:

$$S = \sum_{i=1}^{n} v + p_i \qquad [5]$$

In the Equation [5], the value S is the veracity of the test relationship at the test point-in-time and may be the result of the incrementing; the value n is the number of closest confirmation points-in-time selected at operation 1902; the value v is the base probability; and the value $p_i$ is the value of the probability distribution at each of the closest confirmation points-in-time. At operation 1906, the knowledge graph computing system 102 may return the incremented probability value (e.g., S) as the probability that the test relationship is true at the test point-in-time.

In some examples, the techniques described herein for responding to time-dependent queries may be utilized to verify the veracity of a time-dependent relationship as the relationship is incorporated into the knowledge graph data structure 104. A time-dependent relationship may be a relationship that is provided with a time-dependent statement. Consider the example statement from above: "Elizabeth II was Queen of the United Kingdom in 1967." This relationship depends on a test point-in-time, which is 1967. Accordingly, before a time-dependent relationship is written to the knowledge graph data structure 104 as a triple data unit, it may be desirable to verify the time-dependent relationship. In some examples, a triple data unit may indicate a time-dependent relationship as an additional predicate or object of the relationship according to a suitable format such as, for example, RDF*. Referring to the example statement above the information "in 1967" could be added to the triple data unit indicating "Elizabeth II was Queen of the United Kingdom."

Figure 20:
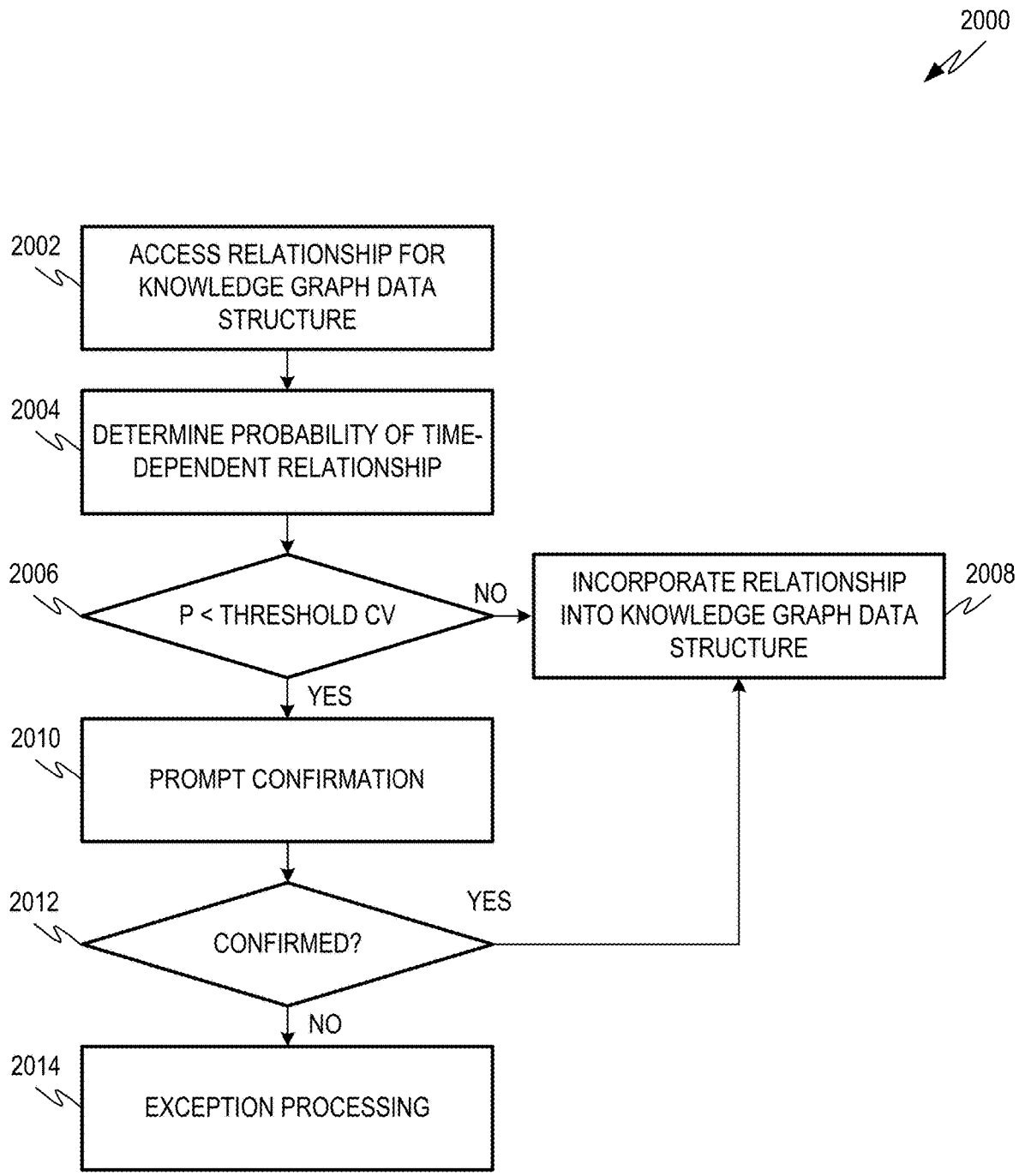
FIG. 20 is a flowchart showing one example of a process flow that may be executed by the knowledge graph computing system of FIG. 1 to incorporate a time-dependent relationship into the knowledge graph data structure.

FIG. 20 is a flowchart showing one example of a process flow 2000 that may be executed by the knowledge graph computing system 102 to incorporate a time-dependent relationship into the knowledge graph data structure 104. At operation 2002, the knowledge graph computing system 102 may access a candidate time-dependent relationship. The candidate time-dependent relationship may have been extracted from a document 110, received from and/or verified by a user 124, 130. At operation 2004, the knowledge graph computing system 102 may determine a time-dependent probability of the candidate time-dependent relationship. This may be performed, for example, as described herein with respect to FIGS. 11-19. At operation 2006, the knowledge graph computing system 102 determines if the probability determined at operation 2004 is less than a threshold confidence value. If the probability is not less than the threshold confidence value, then at operation 2008 the knowledge graph computing system may incorporate the candidate time-dependent relationship into the knowledge graph data structure 104, for example, as described herein.

If the returned probability is less than the threshold confidence value, the knowledge graph computing system may, at operation 2010, obtain a confirmation of the candidate time-dependent relationship. This may include, for example, prompting a user, such as the administrative user 124, to verify the veracity of the candidate time-dependent relationship. If the user confirms the candidate time-dependent relationship at operation 2012, then the knowledge graph imputing system may incorporate the time-dependent relationship into the knowledge graph data structure 104 at operation 2008. If the user does not confirm the veracity of the candidate time-dependent relationship at operation 2012, then the knowledge graph computing system 102 may perform exception processing at operation 2014. Exception processing may include, for example, postponing or canceling the addition of the time-dependent relationship to the knowledge graph data structure 104.

Figure 21:
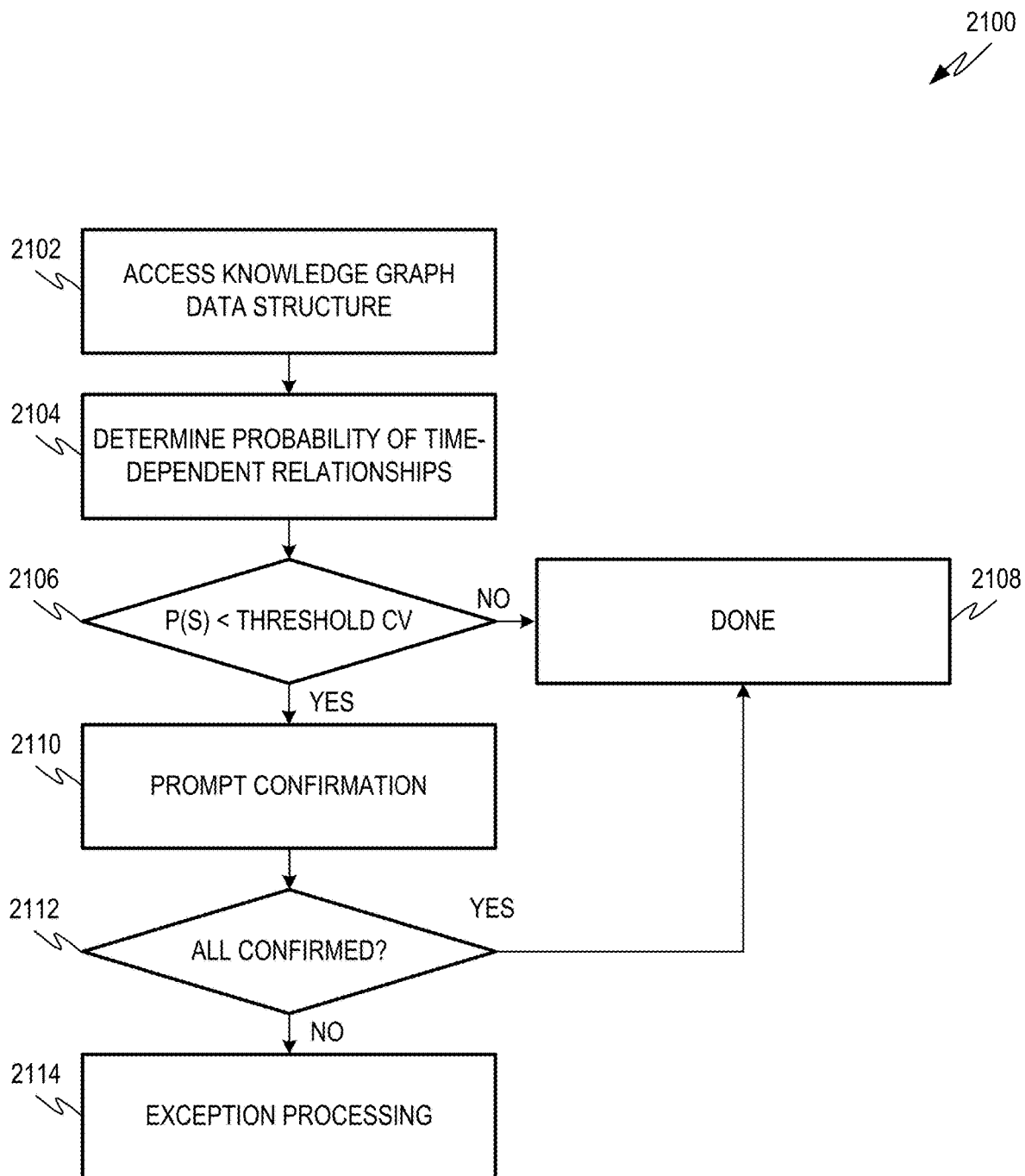
FIG. 21 is a flowchart showing one example of a process flow that may be executed by the knowledge graph computing system of FIG. 1 to evaluate the veracity of time-dependent relationships in the knowledge graph data structure.

In some examples, the knowledge graph computing system 102 may analyze the knowledge graph data structure 104 to evaluate the veracity of time-dependent relationships reflected by the knowledge graph data structure 104. For example, one or more relationships described by triple data units, as described herein, may be based on a point-in-time. FIG. 21 is a flowchart showing one example of a process flow 2100 that may be executed by the knowledge graph computing system 102 to evaluate the veracity of time-dependent relationships in the knowledge graph data structure 104.

At operation 2102, the knowledge graph computing system 102 may access the knowledge graph data structure 104. At operation 2104, the knowledge graph computing system 102 may determine a probability of one or more time-dependent relationships represented by triple data units at the knowledge graph data structure 104. This may be performed, for example, as described herein with respect to FIGS. 11-19.

At operation 2106, the knowledge graph computing system 102 may determine if the knowledge graph data structure 104 includes triple data units describing any relationships that have a probability that is less than a threshold confidence value. If no time-dependent relationships have a probability less than the threshold confidence value, then the process flow 2100 may conclude at operation 2108. If any time-dependent relationships have a probability less than the threshold confidence value, then the knowledge graph computing system 102 may, at operation 2110, prompt a user, such as the administrative user 130, to confirm the time-dependent relationships having a probability less than the threshold confidence value.

At operation 2112, the knowledge graph computing system 102 may determine if all of the time-dependent relationships having a probability less than the threshold confidence value have been confirmed. If all have been confirmed, then the process flow 2100 may conclude at operation 2108. If any time-dependent relationships having a probability less than the threshold confidence value are not confirmed at operation 2112, then the knowledge graph computing system 102 may perform exception processing at operation 2114. Exception processing may include, for example, removing from the knowledge graph data structure 104 triple data units describing time-dependent relationships having a probability less than the threshold confidence value and being unconfirmed. In another example, exception processing may include submitting time-dependent relationships having a probability less than the threshold confidence value and being unconfirmed for additional review.

Figure 22:
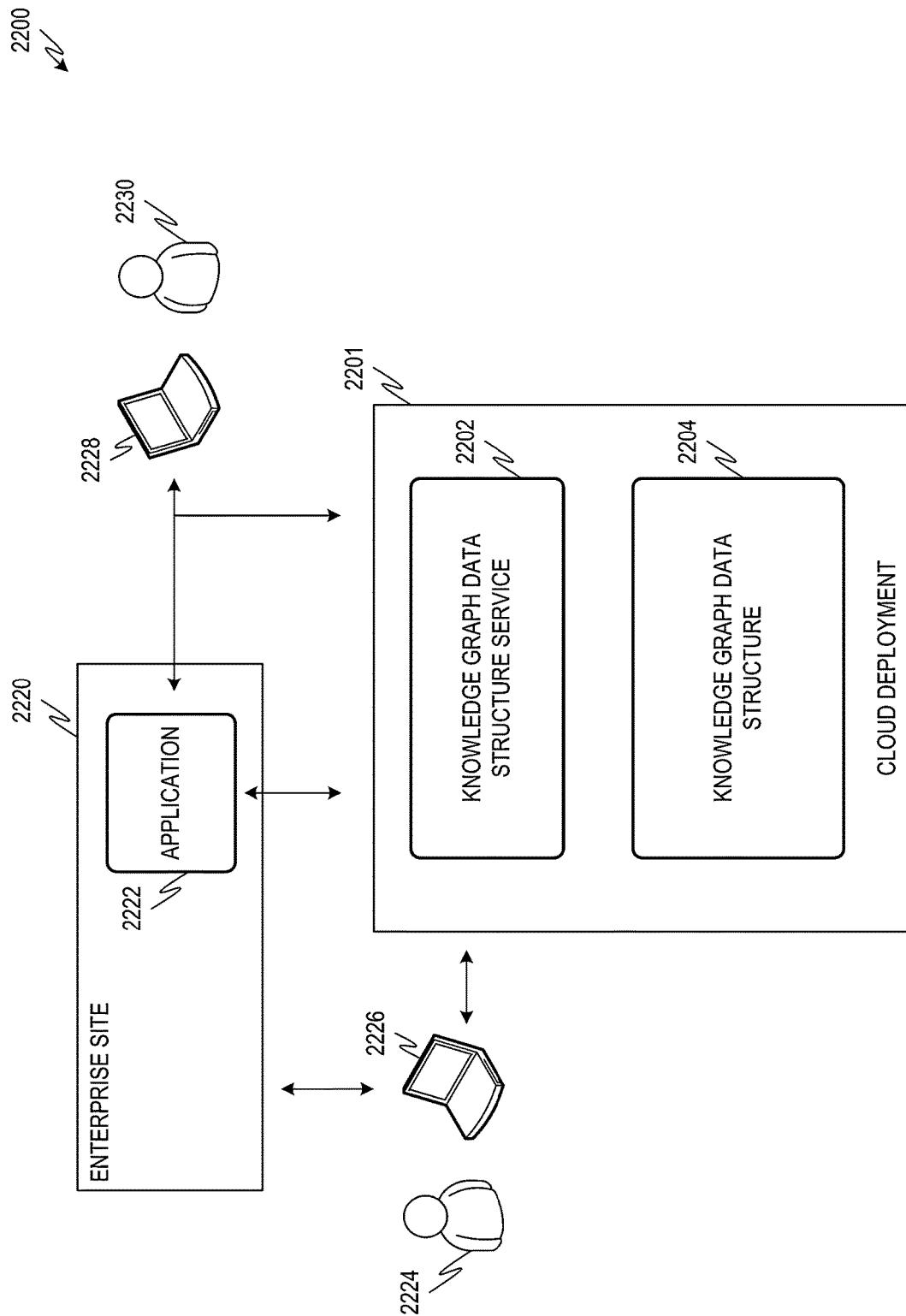
FIG. 22 is a diagram showing one example of an environment implementing a knowledge graph data structure service.

FIG. 22 is a diagram showing one example of an environment 2200 implementing a knowledge graph data structure service 2202. The knowledge graph data structure service 2202 may operate in a manner similar to the knowledge graph computing system 102 described herein. In some examples the knowledge graph data structure service 2202 and a knowledge graph data structure 2204 may be executed at a cloud deployment 2201. The cloud deployment 2201 may include one or more data centers implementing one or more virtual and/or hardware servers. The cloud deployment 2201 executes the knowledge graph data structure service 2202 and implements the knowledge graph data structure 2204 at one or more data stores.

A user 2230 may access the knowledge graph data structure service 2202 via a user computing device 2228 as described herein. In some examples, the knowledge graph data structure service 2202 may be executed in conjunction with an enterprise application 2222. In the example of FIG. 22, the enterprise application 2222 is executed at an enterprise site 2220. The enterprise site 2220 may be an on-promise and/or cloud-implemented computing system for executing the enterprise application 2222. The user 2230, in some examples, may access the knowledge graph data structure service 2202 via the enterprise application 2222. For example, the user 2230 may utilize the enterprise application 2222 to make queries of the knowledge graph data structure 2204 via the knowledge graph data structure service 2202. Replies to queries made by the enterprise application 2222 may be utilized in the processing of the enterprise application 2222, for example, so as to serve the user 2230.

FIG. 22 also shows an administrative user 2224. The administrative user 2224 may access the enterprise site 2220, the enterprise application 2222, and/or the knowledge graph data structure service 2202 via a user computing device 2226. In some examples, the administrative user 2224 may perform functions similar to those of the administrative user 124 described herein. The administrative user 2224, and some examples, may have additional administrative roles with respect to the knowledge graph data structure service 2202 and/or the enterprise application 2222.

Figure 23:
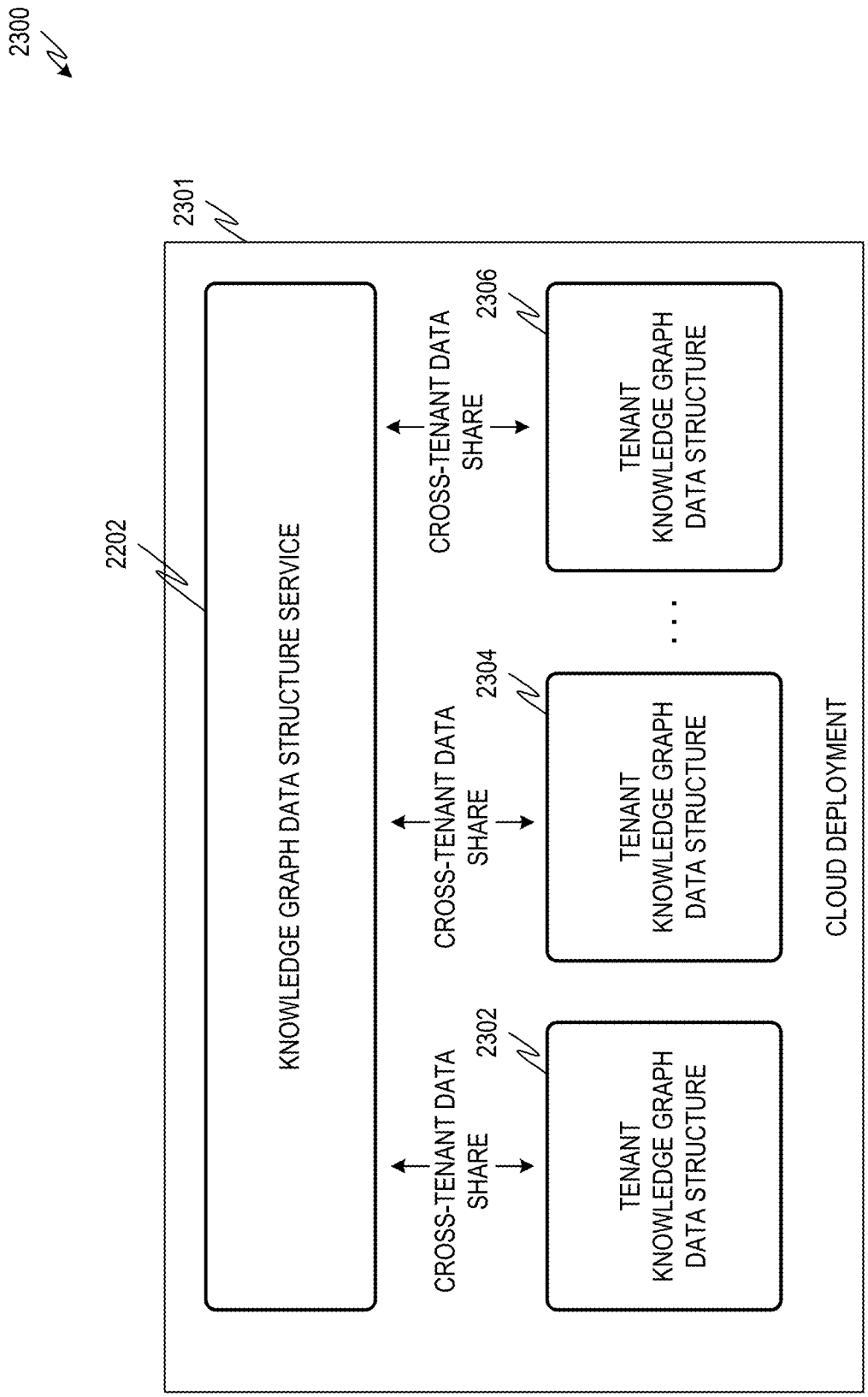
FIG. 23 is a diagram showing one example of a cloud environment for implementing a knowledge graph data structure service.

In some examples, time-dependent queries and relationships may be validated in a cloud environment using confirmation points-in-time shared between tenants of the cloud environment. FIG. 23 is a diagram showing one example of a cloud environment 2300 for implementing a knowledge graph data structure service 2202. The cloud environment 2300 includes a cloud deployment 2301, which may be similar to the cloud deployment 2201 of FIG. 22. In this example, the cloud deployment 2301 comprises a plurality of different tenancies. Each tenancy may be associated with different customers such as, for example, different customer enterprises.

In the example of FIG. 23, the cloud deployment comprises a knowledge graph data structure service 2202 and separate tenant knowledge graph data structures 2302, 2304, 2306. Each tenant knowledge graph data structure 2302, 2304, 2306 may be associated with a separate tenancy at the cloud deployment 2301. Also, each of the respective tenant knowledge graph data structures 2302, 2304, 2306 may include various triple data units indicating relationships.

The relationships stored by a different tenant knowledge graph data structures 2302, 2304, 2306, in some examples, are proprietary to the respective tenants. Accordingly, it may not be desirable to give one tenant access to another tenant's knowledge graph data structure 2302, 2304, 2306. In some examples, however, the knowledge graph data structure service 2202 may be configured to identify equivalent relationships from among the tenant knowledge graph data structures 2302, 2304, 2306 and to share some or all confirmation points-in-time for the equivalent relationships. This may involve, for example, writing to the time subunits of triple data units corresponding to the equivalent relationship's confirmation points-in-time from the other tenant knowledge graph data structures 2302, 2304, 2306.

In some examples, confirmation points-in-time may be shared between tenant knowledge graph data structures 2302, 2304, 2306 based on a confidentiality level of the document 110 from which the confirmation points-in-time are extracted. For example, if a confirmation point-in-time in the tenant knowledge graph data structure 2302 was extracted from a document 110 that was internal to the respective tenant, that confirmation point-in-time may not be shared to the tenant knowledge graph data structures 2304, 2306 of the other tenants. On the other hand, if the tenant knowledge graph data structure 2302 includes a triple data unit reflecting a confirmation point-in-time extracted from a non-confidential document, then that confirmation point-in-time may be shared to triple data units indicating equivalent relationships at the other tenant knowledge graph data structures 2304, 2306.

EXAMPLES

Example 1 is a computing system for utilizing relationship data, the computing system comprising: at least one processor programmed to perform operations comprising: receiving, from a second computing system, a first time-dependent query against a knowledge graph data structure, the first time-dependent query comprising an indication of a first test relationship, and an indication of a first test point-in-time, the first test relationship being described by a first time period during which the first test relationship is true; accessing confirmation data from the knowledge graph data structure, the confirmation data describing a first plurality of confirmation points-in-time at which the first test relationship is true; determining, using the first plurality of confirmation points-in-time, that at least one of a beginning or an end of the first time period is not defined by the knowledge graph data structure; determining a response to the first time-dependent query indicating a veracity of the first test relationship at the first test point-in-time using the first plurality of confirmation points-in-time; and sending the response to the first time-dependent query to the second computing system.

In Example 2, the subject matter of Example 1 optionally includes the operations further comprising: determining that the beginning of the first time period is defined and that the end of the first time period is not defined by the knowledge graph data structure; and determining that a number of the first plurality of confirmation points-in-time are before the first test point-in-time, the response to the first time-dependent query indicating that the first test relationship is true at the first test point-in-time.

In Example 3, the subject matter of any one or more of Examples 1-2 optionally include the operations further comprising: determining that the beginning of the first time period is defined and that the end of the first time period is not defined by the knowledge graph data structure; and fitting a probability distribution to the first plurality of confirmation points-in-time, the veracity of the first test relationship at the first test point-in-time being a value of the probability distribution at the first test point-in-time.

In Example 4, the subject matter of any one or more of Examples 1-3 optionally include the operations further comprising: determining that the beginning of the first time period is not defined by the knowledge graph data structure; determining that the end of the first time period is not defined by the knowledge graph data structure; and positioning a probability distribution using the first plurality of confirmation points-in-time, the veracity of the first test relationship at the first test point-in-time being a value of the probability distribution at the first test point-in-time.

In Example 5, the subject matter of any one or more of Examples 1-4 optionally include the operations further comprising: determining that the first test relationship is a multi-period relationship; selecting a first confirmation point-in-time of the first plurality of confirmation points-in-time that is after the first test point-in-time; and selecting a second confirmation point-in-time of the first plurality of confirmation points-in-time that is before the first test point-in-time, the veracity of the first test relationship at the first test point-in-time being based at least in part on a first probability distribution centered at the first confirmation point-in-time and a second probability distribution centered on the second confirmation point-in-time.

In Example 6, the subject matter of any one or more of Examples 1-5 optionally include the accessing of the confirmation data comprising accessing a first triple data unit from the knowledge graph data structure, the first triple data unit corresponding to the first test relationship.

In Example 7, the subject matter of any one or more of Examples 1-6 optionally include the accessing of the confirmation data comprising accessing a plurality of triple data units from the knowledge graph data structure.

In Example 8, the subject matter of any one or more of Examples 1-7 optionally include the operations further comprising: accessing a candidate relationship comprising a candidate subject entity, a candidate predicate, a candidate object, and a candidate point-in-time; accessing a second plurality of confirmation points-in-time at which the candidate relationship is true; determining veracity of the candidate relationship at the candidate point-in-time using the second plurality of confirmation points-in-time; determining that the veracity of the candidate relationship at the candidate point-in-time is greater than a threshold value; and after determining that the veracity of the candidate relationship at the candidate point-in-time is greater than the threshold value, incorporating the candidate relationship into the knowledge graph data structure.

In Example 9, the subject matter of any one or more of Examples 1-8 optionally include the operations further comprising: accessing a second test triple data unit from the knowledge graph data structure, the second test triple data unit describing a second test relationship and a second test point-in-time; accessing second confirmation data from the knowledge graph data structure, the second confirmation data describing a second plurality of confirmation points-in-time at which the second test relationship is true; determining that a veracity of the second test relationship at the second test point-in-time is less than a threshold value; and obtaining a confirmation of the second test relationship.

In Example 10, the subject matter of any one or more of Examples 1-9 optionally include the knowledge graph data structure being stored at a first tenancy of a plurality of tenancies at a cloud deployment, the operations further comprising: accessing a second knowledge graph data structure stored at a second tenancy of the plurality of tenancies at the cloud deployment; and using the second knowledge graph data structure to determine at least a portion of the first plurality of confirmation points-in-time at which the first test relationship is true.

Example 11 is a method for utilizing relationship data in a knowledge graph computing system, the method comprising: receiving, by the knowledge graph computing system and from a second computing system, a first time-dependent query against a knowledge graph data structure, the first time-dependent query comprising an indication of a first test relationship and an indication of a first test point-in-time, the first test relationship being described by a first time period during which the first test relationship is true; accessing, by the knowledge graph computing system, confirmation data from the knowledge graph data structure, the confirmation data describing a first plurality of confirmation points-in-time at which the first test relationship is true; determining, by the knowledge graph computing system and using the first plurality of confirmation points-in-time, that at least one of a beginning or an end of the first time period is not defined by the knowledge graph data structure; determining, by the knowledge graph computing system, a response to the first time-dependent query indicating a veracity of the first test relationship at the first test point-in-time using the first plurality of confirmation points-in-time; and sending the response to the first time-dependent query, by the knowledge graph computing system and to the second computing system.

In Example 12, the subject matter of Example 11 optionally includes determining, by the knowledge graph computing system, that the beginning of the first time period is defined and that the end of the first time period is not defined by the knowledge graph data structure; and determining, by the knowledge graph computing system, that a number of the first plurality of confirmation points-in-time are before the first test point-in-time, the response to the first time-dependent query indicating that the first test relationship is true at the first test point-in-time.

In Example 13, the subject matter of any one or more of Examples 11-12 optionally include determining, by the knowledge graph computing system, that the beginning of the first time period is defined and that the end of the first time period is not defined by the knowledge graph data structure; and fitting a probability distribution to the first plurality of confirmation points-in-time, the veracity of the first test relationship at the first test point-in-time being a value of the probability distribution at the first test point-in-time.

In Example 14, the subject matter of any one or more of Examples 11-13 optionally include determining, by the knowledge graph computing system, that the beginning of the first time period is not defined by the knowledge graph data structure; determining, by the knowledge graph computing system, that the end of the first time period is not defined by the knowledge graph data structure; and positioning a probability distribution using the first plurality of confirmation points-in-time, the veracity of the first test relationship at the first test point-in-time being a value of the probability distribution at the first test point-in-time.

In Example 15, the subject matter of any one or more of Examples 11-14 optionally include determining, by the knowledge graph computing system, that the first test relationship is a multi-period relationship; selecting, by the knowledge graph computing system, a first confirmation point-in-time of the first plurality of confirmation points-in-time that is after the first test point-in-time; and selecting, by the knowledge graph computing system, a second confirmation point-in-time of the first plurality of confirmation points-in-time that is before the first test point-in-time, the veracity of the first test relationship at the first test point-in-time being based at least in part on a first probability distribution centered at the first confirmation point-in-time and a second probability distribution centered on the second confirmation point-in-time.

In Example 16, the subject matter of any one or more of Examples 11-15 optionally include the accessing of the confirmation data comprising accessing a first triple data unit from the knowledge graph data structure, the first triple data unit corresponding to the first test relationship.

In Example 17, the subject matter of any one or more of Examples 11-16 optionally include accessing, by the knowledge graph computing system, a candidate relationship comprising a candidate subject entity, a candidate predicate, a candidate object, and a candidate point-in-time; accessing, by the knowledge graph computing system, a second plurality of confirmation points-in-time at which the candidate relationship is true; determining, by the knowledge graph computing system, a veracity of the candidate relationship at the candidate point-in-time using the second plurality of confirmation points-in-time; determining, by the knowledge graph computing system, that the veracity of the candidate relationship at the candidate point-in-time is greater than a threshold value; and after determining that the veracity of the candidate relationship at the candidate point-in-time is greater than the threshold value, incorporating the candidate relationship into the knowledge graph data structure.

In Example 18, the subject matter of any one or more of Examples 11-17 optionally include accessing, by the knowledge graph computing system, a second test triple data unit from the knowledge graph data structure, the second test triple data unit describing a second test relationship and a second test point-in-time; accessing, by the knowledge graph computing system, second confirmation data from the knowledge graph data structure, the second confirmation data describing a second plurality of confirmation points-in-time at which the second test relationship is true; determining, by the knowledge graph computing system, that a veracity of the second test relationship at the second test point-in-time is less than a threshold value; and obtaining, by the knowledge graph computing system, a confirmation of the second test relationship.

In Example 19, the subject matter of any one or more of Examples 11-18 optionally include the knowledge graph data structure being stored at a first tenancy of a plurality of tenancies at a cloud deployment, the method further comprising: accessing, by the knowledge graph computing system, a second knowledge graph data structure stored at a second tenancy of the plurality of tenancies at the cloud deployment; and using, by the knowledge graph computing system, the second knowledge graph data structure to determine at least a portion of the first plurality of confirmation points-in-time at which the first test relationship is true.

Example 20 is a machine-readable medium comprising instructions thereon that, when executed by at least one processor, cause the at least one processor to perform operations comprising: receiving, from a second computing system, a first time-dependent query against a knowledge graph data structure, the first time-dependent query comprising an indication of a first test relationship, and an indication of a first test point-in-time, the first test relationship being described by a first time period during which the first test relationship is true; accessing confirmation data from the knowledge graph data structure, the confirmation data describing a first plurality of confirmation points-in-time at which the first test relationship is true; determining, using the first plurality of confirmation points-in-time, that at least one of a beginning or an end of the first time period is not defined by the knowledge graph data structure; determining a response to the first time-dependent query indicating a veracity of the first test relationship at the first test point-in-time using the first plurality of confirmation points-in-time; and sending the response to the first time-dependent query to the second computing system.

Figure 24:
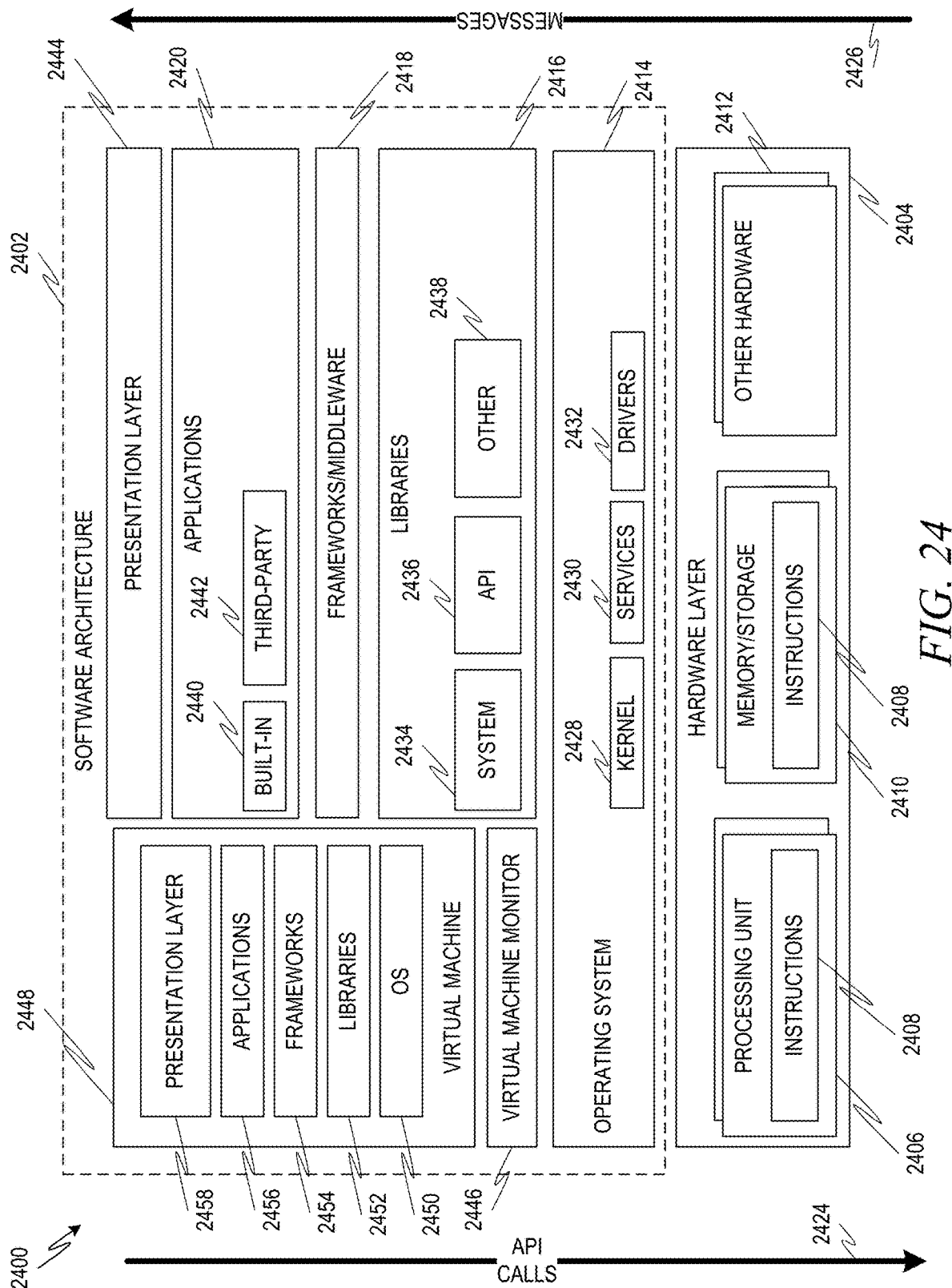
FIG. 24 is a block diagram showing one example of an architecture for a computing device.

FIG. 24 is a block diagram 2400 showing one example of a software architecture 2402 for a computing device. The architecture 2402 may be used in conjunction with various hardware architectures, for example, as described herein. FIG. 24 is merely a non-limiting example of a software architecture and many other architectures may be implemented to facilitate the functionality described herein. A representative hardware layer 2404 is illustrated and can represent, for example, any of the above referenced computing devices. In some examples, the hardware layer 2404 may be implemented according to the architecture of the computer system of FIG. 25.

The representative hardware layer 2404 comprises one or more processing units 2406 having associated executable instructions 2408. Executable instructions 2408 represent the executable instructions of the software architecture 2402, including implementation of the methods, modules, subsystems, and components, and so forth described herein and may also include memory and/or storage modules 2410, which also have executable instructions 2408. Hardware layer 2404 may also comprise other hardware as indicated by other hardware 2412 which represents any other hardware of the hardware layer 2404, such as the other hardware illustrated as part of the architecture 2402.

In the example architecture of FIG. 24, the software architecture 2402 may be conceptualized as a stack of layers where each layer provides particular functionality. For example, the software architecture 2402 may include layers such as an operating system 2414, libraries 2416, middleware layer 2418, applications 2420, and presentation layer 2444. Operationally, the applications 2420 and/or other components within the layers may invoke API calls 2424 through the software stack and access a response, returned values, and so forth illustrated as messages 2426 in response to the API calls 2424. The layers illustrated are representative in nature and not all software architectures have all layers. For example, some mobile or special purpose operating systems may not provide a middleware layer 2418, while others may provide such a layer. Other software architectures may include additional or different layers.

The operating system 2414 may manage hardware resources and provide common services. The operating system 2414 may include, for example, a kernel 2428, services 2430, and drivers 2432. The kernel 2428 may act as an abstraction layer between the hardware and the other software layers. For example, the kernel 2428 may be responsible for memory management, processor management (e.g., scheduling), component management, networking, security settings, and so on. The services 2430 may provide other common services for the other software layers. In some examples, the services 2430 include an interrupt service. The interrupt service may detect the receipt of an interrupt and, in response, cause the architecture 2402 to pause its current processing and execute an interrupt service routine (ISR) when an interrupt is accessed.

The drivers 2432 may be responsible for controlling or interfacing with the underlying hardware. For instance, the drivers 2432 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 2416 may provide a common infrastructure that may be utilized by the applications 2420 and/or other components and/or layers. The libraries 2416 typically provide functionality that allows other software modules to perform tasks in an easier fashion than to interface directly with the underlying operating system 2414 functionality (e.g., kernel 2428, services 2430 and/or drivers 2432). The libraries 2416 may include system libraries 2434 (e.g., C standard library) that may provide functions such as memory allocation functions, string manipulation functions, mathematic functions, and the like. In addition, the libraries 2416 may include API libraries 2436 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 2416 may also include a wide variety of other libraries 2438 to provide many other APIs to the applications 2420 and other software components/modules.

The middleware layer 2418 (also sometimes referred to as frameworks) may provide a higher-level common infrastructure that may be utilized by the applications 2420 and/or other software components/modules. For example, the middleware layer 2418 may provide various graphic user interface (GUI) functions, high-level resource management, high-level location services, and so forth. The middleware layer 2418 may provide a broad spectrum of other APIs that may be utilized by the applications 2420 and/or other software components/modules, some of which may be specific to a particular operating system or platform.

The applications 2420 includes built-in applications 2440 and/or third-party applications 2442. Examples of representative built-in applications 2440 may include, but are not limited to, a contacts application, a browser application, a book reader application, a location application, a media application, a messaging application, and/or a game application. Third-party applications 2442 may include any of the built-in applications 2440 as well as a broad assortment of other applications. In a specific example, the third-party application 2442 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 2442 may invoke the API calls 2424 provided by the mobile operating system such as operating system 2414 to facilitate functionality described herein.

The applications 2420 may utilize built-in operating system functions (e.g., kernel 2428, services 2430 and/or drivers 2432), libraries (e.g., system libraries 2434, API libraries 2436, and other libraries 2438), and middleware layer 2418 to create user interfaces to interact with users of the system. Alternatively, or additionally, in some systems interactions with a user may occur through a presentation layer, such as presentation layer 2444. In these systems, the application/module "logic" can be separated from the aspects of the application/module that interact with a user.

Some software architectures utilize virtual machines. In the example of FIG. 24, this is illustrated by virtual machine 2448. A virtual machine creates a software environment where applications/modules can execute as if they were executing on a hardware computing device. A virtual machine is hosted by a host operating system (operating system 2414) and typically, although not always, has a virtual machine monitor 2446, which manages the operation of the virtual machine as well as the interface with the host operating system (i.e., operating system 2414). A software architecture executes within the virtual machine such as an operating system 2450, libraries 2452, frameworks/middleware 2454, applications 2456 and/or presentation layer 2458. These layers of software architecture executing within the virtual machine 2448 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 25:
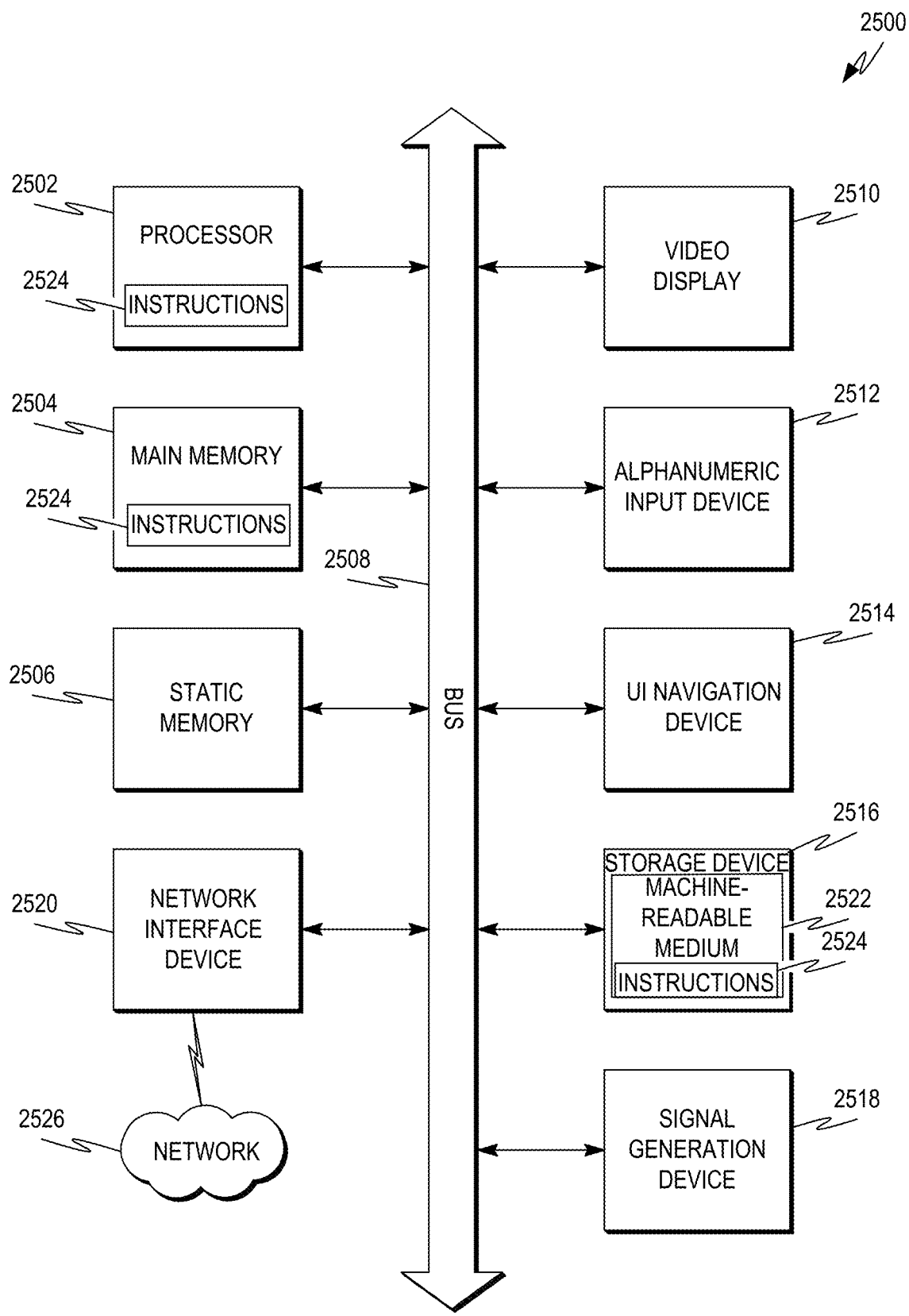
FIG. 25 is a block diagram of a machine in the example form of a computer system within which instructions may be executed for causing the machine to perform any one or more of the methodologies discussed herein.

FIG. 25 is a block diagram of a machine in the example form of a computer system 2500 within which instructions 2524 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2500 includes a processor 2502 (e.g., a central processing unit (CPU), a graphics processing unit (GPU), or both), a main memory 2504, and a static memory 2506, which communicate with each other via a bus 2508. The computer system 2500 may further include a video display unit 2510 (e.g., a liquid crystal display (LCD) or a cathode ray tube (CRT)). The computer system 2500 also includes an alphanumeric input device 2512 (e.g., a keyboard or a touch-sensitive display screen), a user interface (UI) navigation (or cursor control) device 2514 (e.g., a mouse), a disk drive unit 2516, a signal generation device 2518 (e.g., a speaker), and a network interface device 2520.

Machine-Readable Medium

The disk drive unit 2516 includes a machine-readable medium 2522 on which is stored one or more sets of data structures and instructions 2524 (e.g., software) embodying or utilized by any one or more of the methodologies or functions described herein. The instructions 2524 may also reside, completely or at least partially, within the main memory 2504 and/or within the processor 2502 during execution thereof by the computer system 2500, with the main memory 2504 and the processor 2502 also constituting machine-readable media 2522.

While the machine-readable medium 2522 is shown in an example embodiment to be a single medium, the term "machine-readable medium" may include a single medium or multiple media (e.g., a centralized or distributed database, and/or associated caches and servers) that store the one or more instructions 2524 or data structures. The term "machine-readable medium" shall also be taken to include any tangible medium that is capable of storing, encoding, or carrying instructions 2524 for execution by the machine and that cause the machine to perform any one or more of the methodologies of the present disclosure, or that is capable of storing, encoding, or carrying data structures utilized by or associated with such instructions 2524. The term "machine-readable medium" shall accordingly be taken to include, but not be limited to, solid-state memories, and optical and magnetic media. Specific examples of machine-readable media 2522 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 2524 may further be transmitted or received over a communications network 2526 using a transmission medium. The instructions 2524 may be transmitted using the network interface device 2520 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 2524 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computing system for utilizing relationship data, the computing system comprising:
   at least one processor programmed to perform operations comprising:
   receiving, from a second computing system, a first time-dependent query against a knowledge graph data structure, the first time-dependent query comprising an indication of a first test relationship, and an indication of a first test point-in-time, the first test relationship being described by a first time period during which the first test relationship is true;
   accessing confirmation data from the knowledge graph data structure, the confirmation data describing a first plurality of confirmation points-in-time at which the first test relationship is true;
   determining that at least one of a beginning or an end of the first time period is not defined by the knowledge graph data structure at least in part by determining that the first plurality of confirmation points-in-time do not extend past at least one of the beginning or the end of the first time period;
   determining a response to the first time-dependent query indicating a veracity of the first test relationship at the first test point-in-time using the first plurality of confirmation points-in-time; and
   sending the response to the first time-dependent query to the second computing system.

2. The computing system of claim 1, the operations further comprising:
   determining that the beginning of the first time period is defined and that the end of the first time period is not defined by the knowledge graph data structure; and
   determining that a number of the first plurality of confirmation points-in-time are before the first test point-in-time, the response to the first time-dependent query indicating that the first test relationship is true at the first test point-in-time.

3. The computing system of claim 1, the operations further comprising:
   determining that the beginning of the first time period is defined and that the end of the first time period is not defined by the knowledge graph data structure; and
   fitting a probability distribution to the first plurality of confirmation points-in-time, the veracity of the first test relationship at the first test point-in-time being a value of the probability distribution at the first test point-in-time.

4. The computing system of claim 1, the operations further comprising:
   determining that the beginning of the first time period is not defined by the knowledge graph data structure;
   determining that the end of the first time period is not defined by the knowledge graph data structure; and
   positioning a probability distribution using the first plurality of confirmation points-in-time, the veracity of the first test relationship at the first test point-in-time being a value of the probability distribution at the first test point-in-time.

5. The computing system of claim 1, the operations further comprising:
   determining that the first test relationship is a multi-period relationship;
   selecting a first confirmation point-in-time of the first plurality of confirmation points-in-time that is after the first test point-in-time; and
   selecting a second confirmation point-in-time of the first plurality of confirmation points-in-time that is before the first test point-in-time, the veracity of the first test relationship at the first test point-in-time being based at least in part on a first probability distribution centered at the first confirmation point-in-time and a second probability distribution centered on the second confirmation point-in-time.

6. The computing system of claim 1, the accessing of the confirmation data comprising accessing a first triple data unit from the knowledge graph data structure, the first triple data unit corresponding to the first test relationship.

7. The computing system of claim 1, the accessing of the confirmation data comprising accessing a plurality of triple data units from the knowledge graph data structure.

8. The computing system of claim 1, the operations further comprising:
   accessing a candidate relationship comprising a candidate subject entity, a candidate predicate, a candidate object, and a candidate point-in-time;
   accessing a second plurality of confirmation points-in-time at which the candidate relationship is true;
   determining veracity of the candidate relationship at the candidate point-in-time using the second plurality of confirmation points-in-time;

determining that the veracity of the candidate relationship at the candidate point-in-time is greater than a threshold value; and after determining that the veracity of the candidate relationship at the candidate point-in- time is greater than the threshold value, incorporating the candidate relationship into the knowledge graph data structure.

9. The computing system of claim 1, the operations further comprising:

accessing a second test triple data unit from the knowledge graph data structure, the second test triple data unit describing a second test relationship and a second test point-in-time;

accessing second confirmation data from the knowledge graph data structure, the second confirmation data describing a second plurality of confirmation points-in-time at which the second test relationship is true;

determining that a veracity of the second test relationship at the second test point-in-time is less than a threshold value; and obtaining a confirmation of the second test relationship.

10. The computing system of claim 1, the knowledge graph data structure being stored at a first tenancy of a plurality of tenancies at a cloud deployment, the operations further comprising:

accessing a second knowledge graph data structure stored at a second tenancy of the plurality of tenancies at the cloud deployment; and using the second knowledge graph data structure to determine at least a portion of the first plurality of confirmation points-in-time at which the first test relationship is true.

11. A method for utilizing relationship data in a knowledge graph computing system, the method comprising:

receiving, by the knowledge graph computing system and from a second computing system, a first time-dependent query against a knowledge graph data structure, the first time-dependent query comprising an indication of a first test relationship and an indication of a first test point-in-time, the first test relationship being described by a first time period during which the first test relationship is true;

accessing, by the knowledge graph computing system, confirmation data from the knowledge graph data structure, the confirmation data describing a first plurality of confirmation points-in-time at which the first test relationship is true;

determining that at least one of a beginning or an end of the first time period is not defined by the knowledge graph data structure at least in part by determining that the first plurality of confirmation points-in-time do not extend past at least one of the beginning or the end of the first time period;

determining, by the knowledge graph computing system, a response to the first time-dependent query indicating a veracity of the first test relationship at the first test point-in-time using the first plurality of confirmation points-in-time; and sending the response to the first time-dependent query, by the knowledge graph computing system and to the second computing system.

12. The method of claim 11, further comprising:

determining, by the knowledge graph computing system, that the beginning of the first time period is defined and that the end of the first time period is not defined by the knowledge graph data structure; and determining, by the knowledge graph computing system, that a number of the first plurality of confirmation points-in-time are before the first test point-in-time, the response to the first time-dependent query indicating that the first test relationship is true at the first test point-in-time.

13. The method of claim 11, further comprising:

determining, by the knowledge graph computing system, that the beginning of the first time period is defined and that the end of the first time period is not defined by the knowledge graph data structure; and fitting a probability distribution to the first plurality of confirmation points-in-time, the veracity of the first test relationship at the first test point-in-time being a value of the probability distribution at the first test point-in-time.

14. The method of claim 11, further comprising:

determining, by the knowledge graph computing system, that the beginning of the first time period is not defined by the knowledge graph data structure;

determining, by the knowledge graph computing system, that the end of the first time period is not defined by the knowledge graph data structure; and positioning a probability distribution using the first plurality of confirmation points-in-time, the veracity of the first test relationship at the first test point-in-time being a value of the probability distribution at the first test point-in-time.

15. The method of claim 11, further comprising:

determining, by the knowledge graph computing system, that the first test relationship is a multi-period relationship;

selecting, by the knowledge graph computing system, a first confirmation point-in-time of the first plurality of confirmation points-in-time that is after the first test point-in-time; and selecting, by the knowledge graph computing system, a second confirmation point-in-time of the first plurality of confirmation points-in-time that is before the first test point-in-time, the veracity of the first test relationship at the first test point-in-time being based at least in part on a first probability distribution centered at the first confirmation point-in-time and a second probability distribution centered on the second confirmation point-in-time.

16. The method of claim 11, the accessing of the confirmation data comprising accessing a first triple data unit from the knowledge graph data structure, the first triple data unit corresponding to the first test relationship.

17. The method of claim 11, further comprising:

accessing, by the knowledge graph computing system, a candidate relationship comprising a candidate subject entity, a candidate predicate, a candidate object, and a candidate point-in-time;

accessing, by the knowledge graph computing system, a second plurality of confirmation points-in-time at which the candidate relationship is true;

determining, by the knowledge graph computing system, a veracity of the candidate relationship at the candidate point-in-time using the second plurality of confirmation points-in-time;

determining, by the knowledge graph computing system, that the veracity of the candidate relationship at the candidate point-in-time is greater than a threshold value; and after determining that the veracity of the candidate relationship at the candidate point-in-time is greater than the threshold value, incorporating the candidate relationship into the knowledge graph data structure.

18. The method of claim 11, further comprising:
accessing, by the knowledge graph computing system, a second test triple data unit from the knowledge graph data structure, the second test triple data unit describing a second test relationship and a second test point-in-time;
accessing, by the knowledge graph computing system, second confirmation data from the knowledge graph data structure, the second confirmation data describing a second plurality of confirmation points-in-time at which the second test relationship is true;
determining, by the knowledge graph computing system, that a veracity of the second test relationship at the second test point-in-time is less than a threshold value; and
obtaining, by the knowledge graph computing system, a confirmation of the second test relationship.

19. The method of claim 11, the knowledge graph data structure being stored at a first tenancy of a plurality of tenancies at a cloud deployment, the method further comprising:
accessing, by the knowledge graph computing system, a second knowledge graph data structure stored at a second tenancy of the plurality of tenancies at the cloud deployment; and
using, by the knowledge graph computing system, the second knowledge graph data structure to determine at least a portion of the first plurality of confirmation points-in-time at which the first test relationship is true.

20. A machine-readable medium comprising instructions thereon that, when executed by at least one processor, cause the at least one processor to perform operations comprising:
receiving, from a second computing system, a first time-dependent query against a knowledge graph data structure, the first time-dependent query comprising an indication of a first test relationship, and an indication of a first test point-in-time, the first test relationship being described by a first time period during which the first test relationship is true;
accessing confirmation data from the knowledge graph data structure, the confirmation data describing a first plurality of confirmation points-in-time at which the first test relationship is true;
determining that at least one of a beginning or an end of the first time period is not defined by the knowledge graph data structure at least in part by determining that the first plurality of confirmation points-in-time do not extend past at least one of the beginning or the end of the first time period;
determining a response to the first time-dependent query indicating a veracity of the first test relationship at the first test point-in-time using the first plurality of confirmation points-in-time; and
sending the response to the first time-dependent query to the second computing system.

* * * * *